United States Patent [19]
Yoshimura

[11] Patent Number: 5,903,528
[45] Date of Patent: May 11, 1999

[54] MULTIPLE DISKS EXCHANGE CONTROLLER

[75] Inventor: Masaki Yoshimura, Sagamihara, Japan

[73] Assignee: Kabushiki Kaisha Kenwood, Japan

[21] Appl. No.: 08/750,001

[22] PCT Filed: Apr. 5, 1996

[86] PCT No.: PCT/JP96/00928

§ 371 Date: Nov. 27, 1996

§ 102(e) Date: Nov. 27, 1996

[87] PCT Pub. No.: WO96/31877

PCT Pub. Date: Oct. 10, 1996

[30]    Foreign Application Priority Data

| Apr. 7, 1995 | [JP] | Japan | 7-108093 |
| Apr. 27, 1995 | [JP] | Japan | 7-127231 |
| Jul. 28, 1995 | [JP] | Japan | 7-212523 |

[51] Int. Cl.$^6$ ................................................. G11B 17/22
[52] U.S. Cl. ............................................ 369/34; 369/36
[58] Field of Search ........................... 369/34, 36, 37, 369/38, 35, 40, 42, 178; 360/98.01, 98.04, 98.05, 99.06

[56]    References Cited

U.S. PATENT DOCUMENTS

| 5,177,722 | 1/1993 | Nakamichi et al. | 369/36 |
| 5,216,645 | 6/1993 | Sakayama | 369/34 |
| 5,353,269 | 10/1994 | Kobayashi et al. | 369/36 |
| 5,384,760 | 1/1995 | Kumakura | 369/38 |
| 5,392,266 | 2/1995 | Kobayashi et al. | 369/36 |
| 5,502,697 | 3/1996 | Taki | 369/34 |
| 5,631,882 | 5/1997 | Mascenik | 369/30 |
| 5,638,347 | 6/1997 | Baca et al. | 369/34 |

FOREIGN PATENT DOCUMENTS

| 0 563 927 A2 | 10/1993 | European Pat. Off. . |
| 0 612 070 A2 | 8/1994 | European Pat. Off. . |
| 0 614 178 A2 | 9/1994 | European Pat. Off. . |
| 0 702 363 A1 | 3/1996 | European Pat. Off. . |
| 0 709 841 A1 | 5/1996 | European Pat. Off. . |
| 44 27 494 A1 | 2/1995 | Germany . |
| 62-192062 | 8/1987 | Japan . |
| 63-175261 | 7/1988 | Japan . |
| 3-99313 | 4/1991 | Japan . |

*Primary Examiner*—Tan Dinh
*Attorney, Agent, or Firm*—Sixbey, Friedman, Leedom & Ferguson, P.C.; Gerald J. Ferguson, Jr.; Tim L. Brackett, Jr.

[57]    ABSTRACT

A disk reproducing apparatus accommodating a plurality of disks capable of exchanging disks during reproduction and reducing a manufacture cost. A stocker 21 houses therein a plurality of disk holding units each for holding a disk. First transport means transports the disk holding unit between the outside of an apparatus housing and the stocker 21. Second transport means transports the disk holding unit between the stocker 21 and reproducing means. The stocker 21 is moved up and down to align the position of the disk holding unit with the position of the first or second transport means. The transport means driven later is first accommodated in the stocker under the conditions that disks are pulled out of the stocker by the first and second transport means.

13 Claims, 35 Drawing Sheets

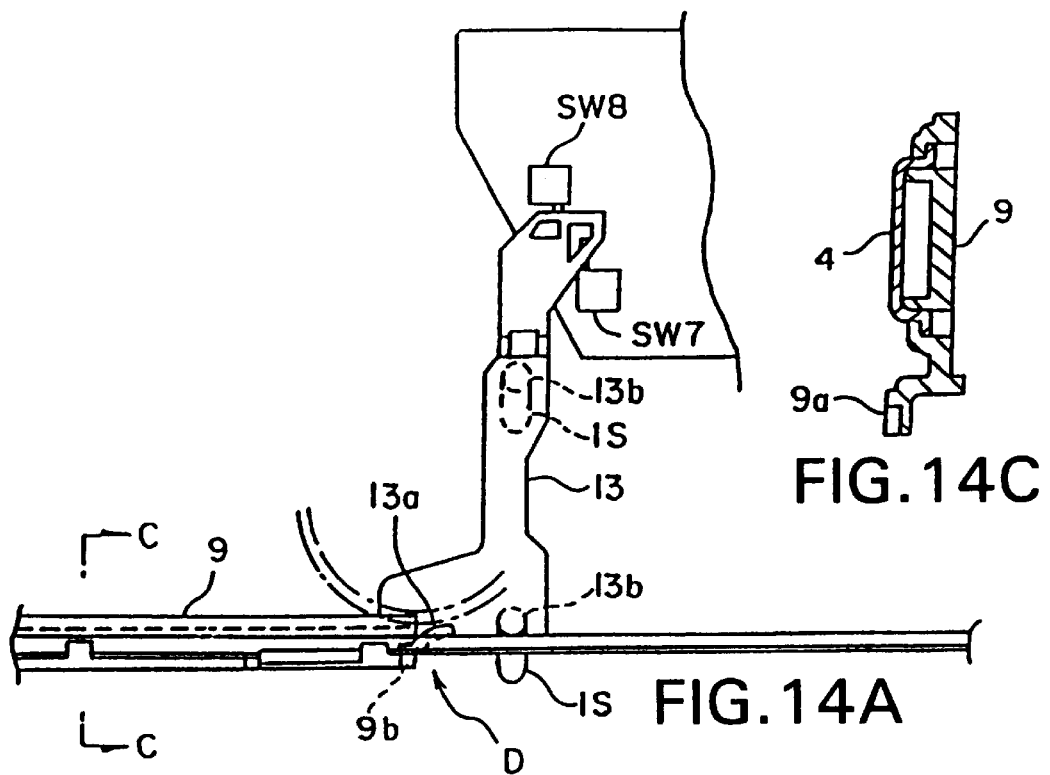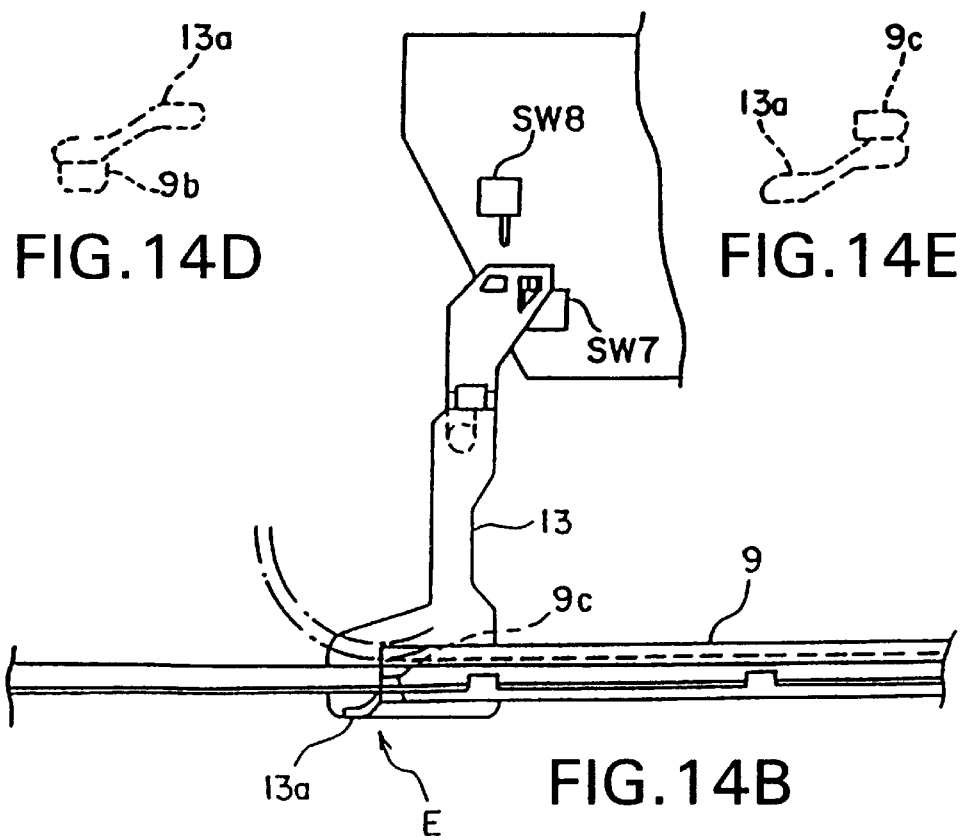

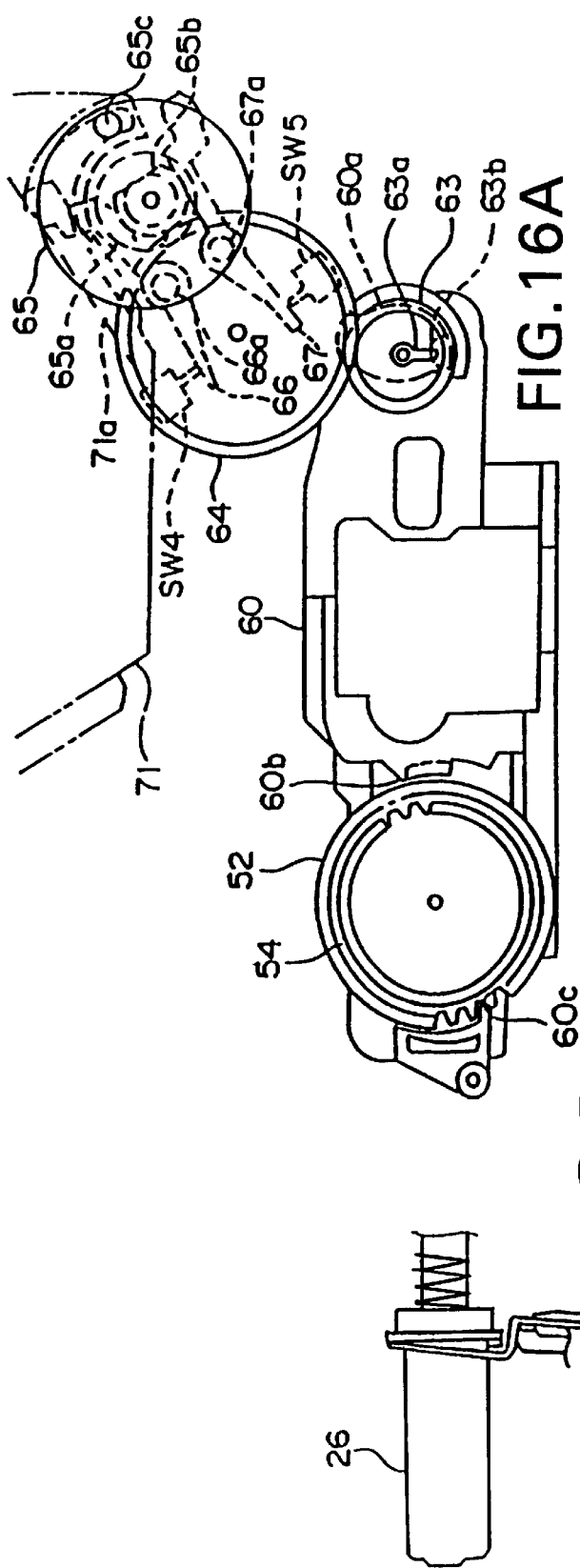
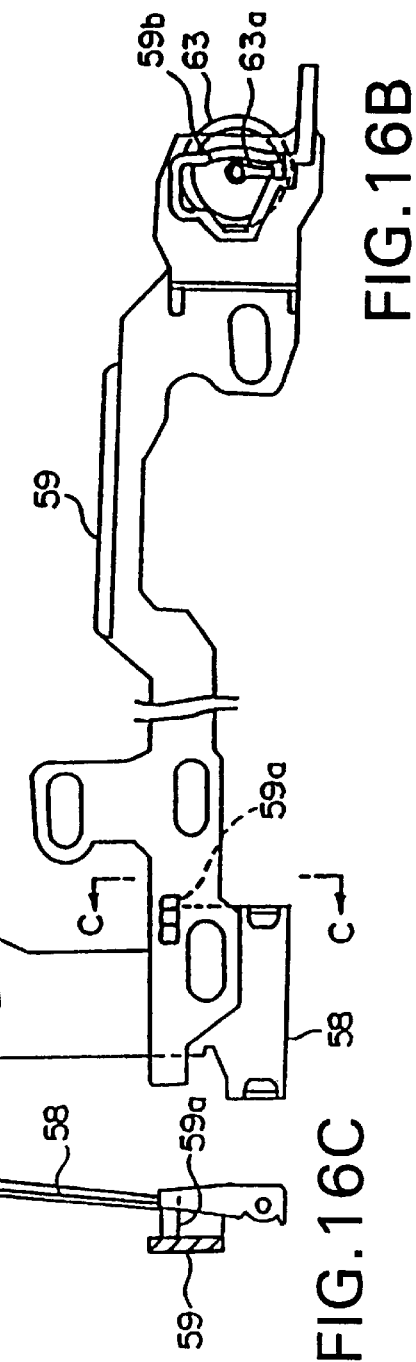
FIG. 16A
FIG. 16B
FIG. 16C

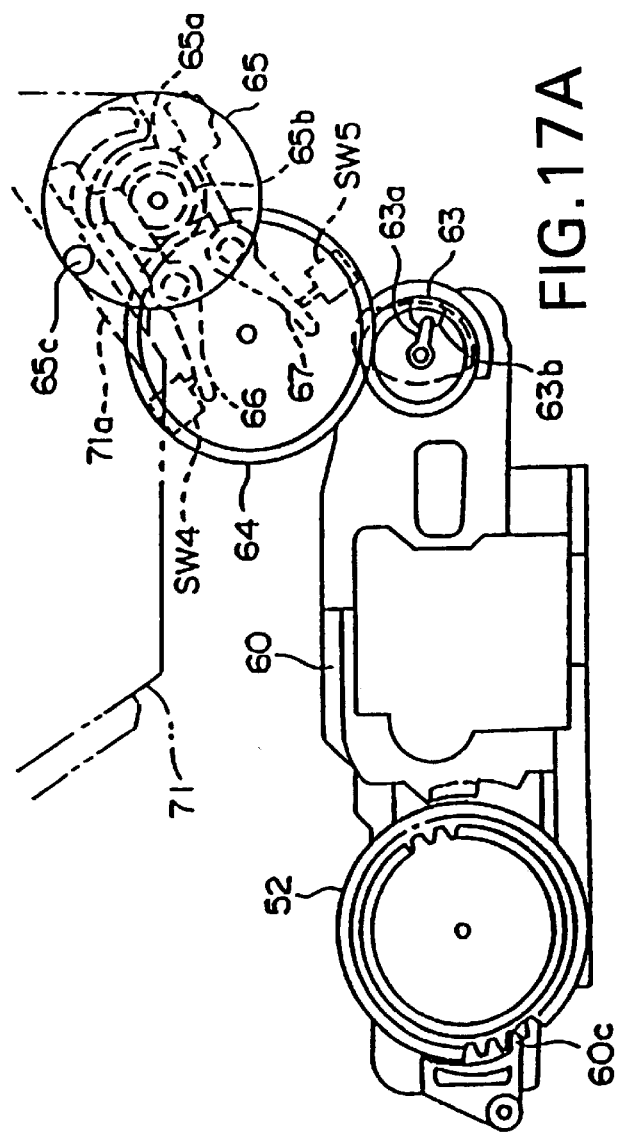
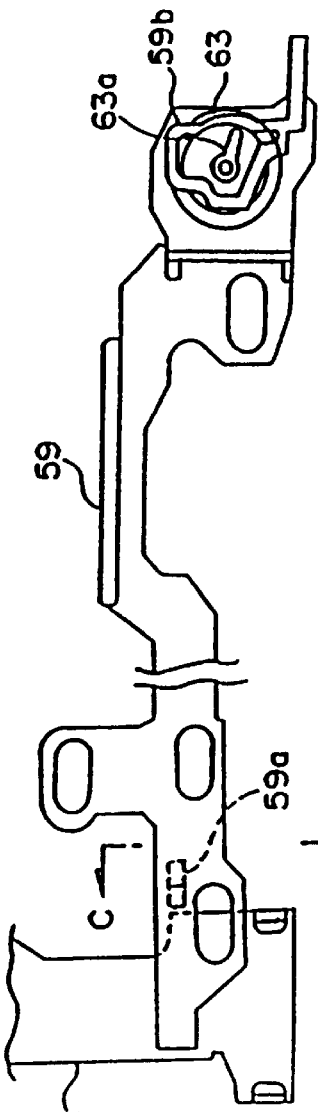
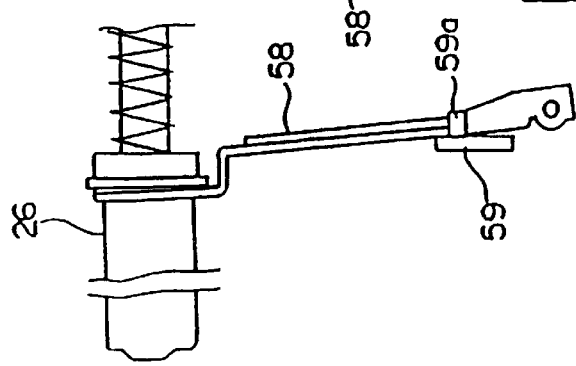
FIG. 17A
FIG. 17B
FIG. 17C

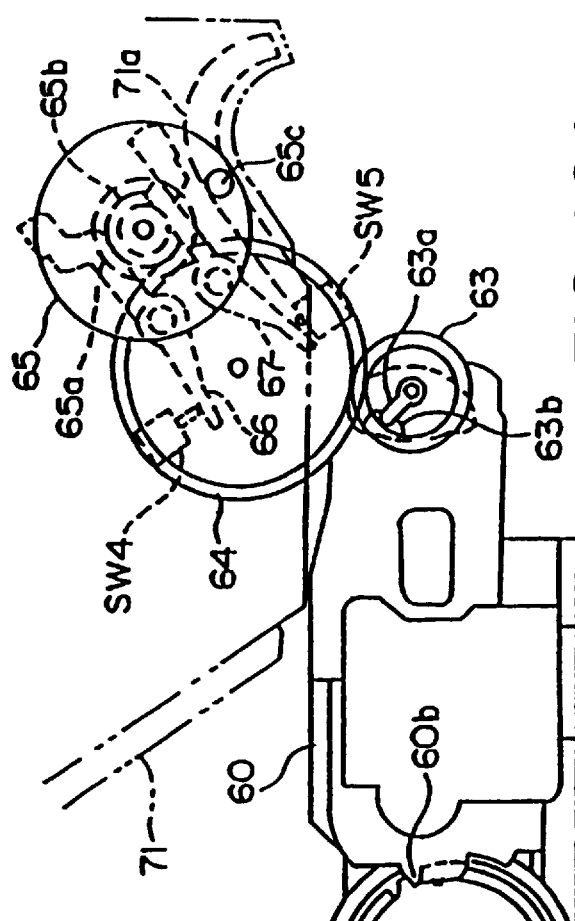
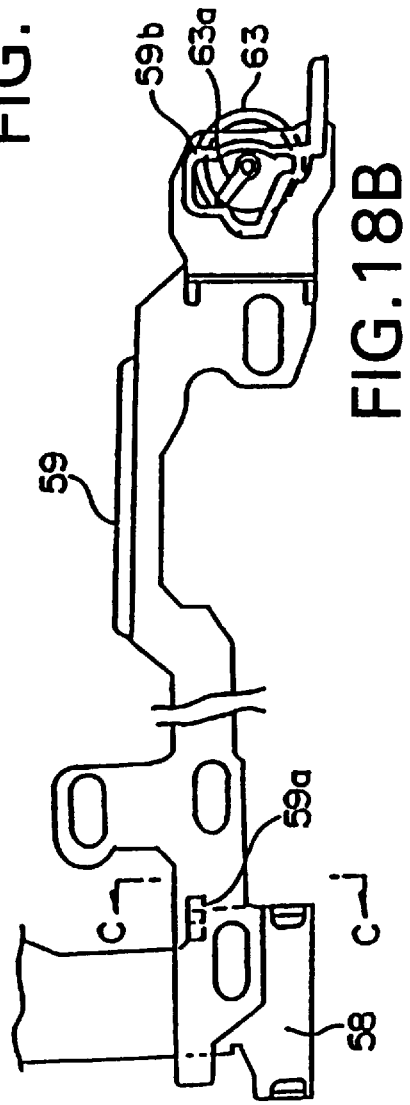
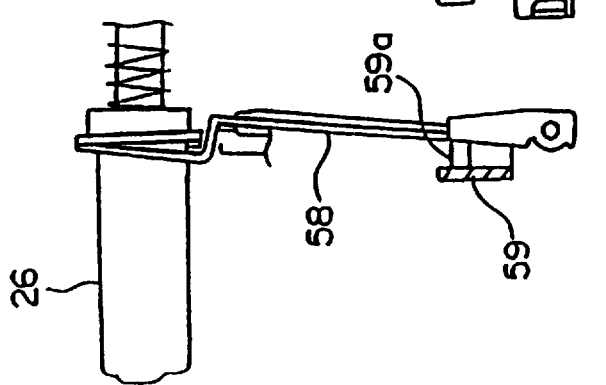
FIG.18A
FIG.18B
FIG.18C

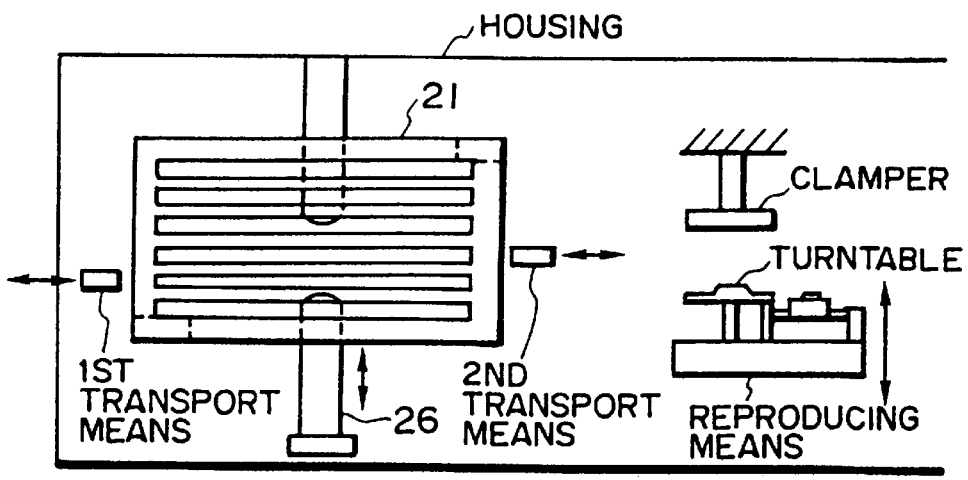
FIG.20A
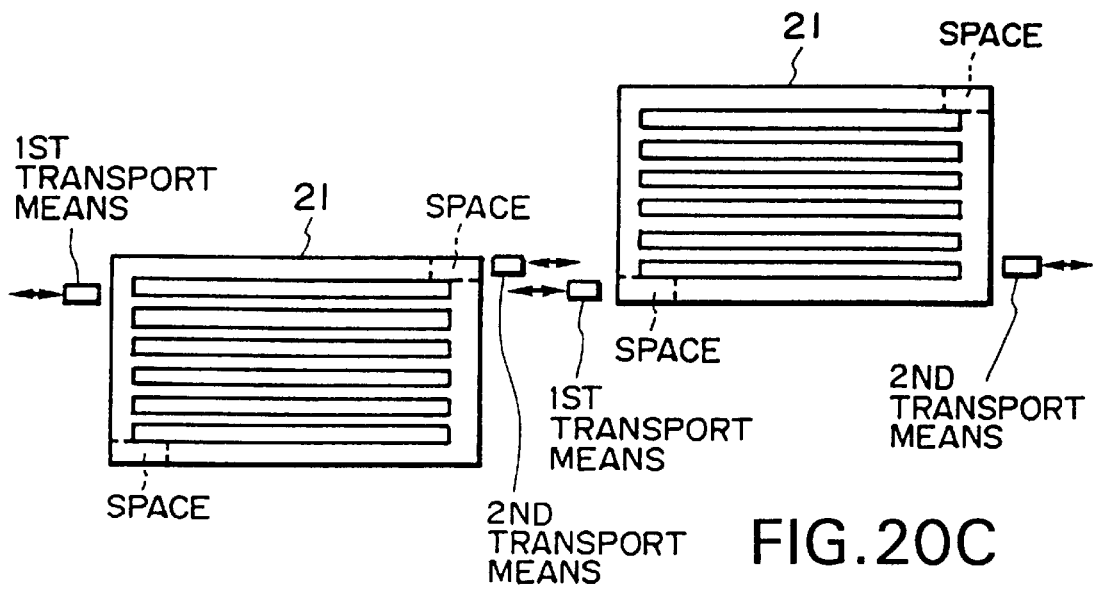
FIG.20B
FIG.20C

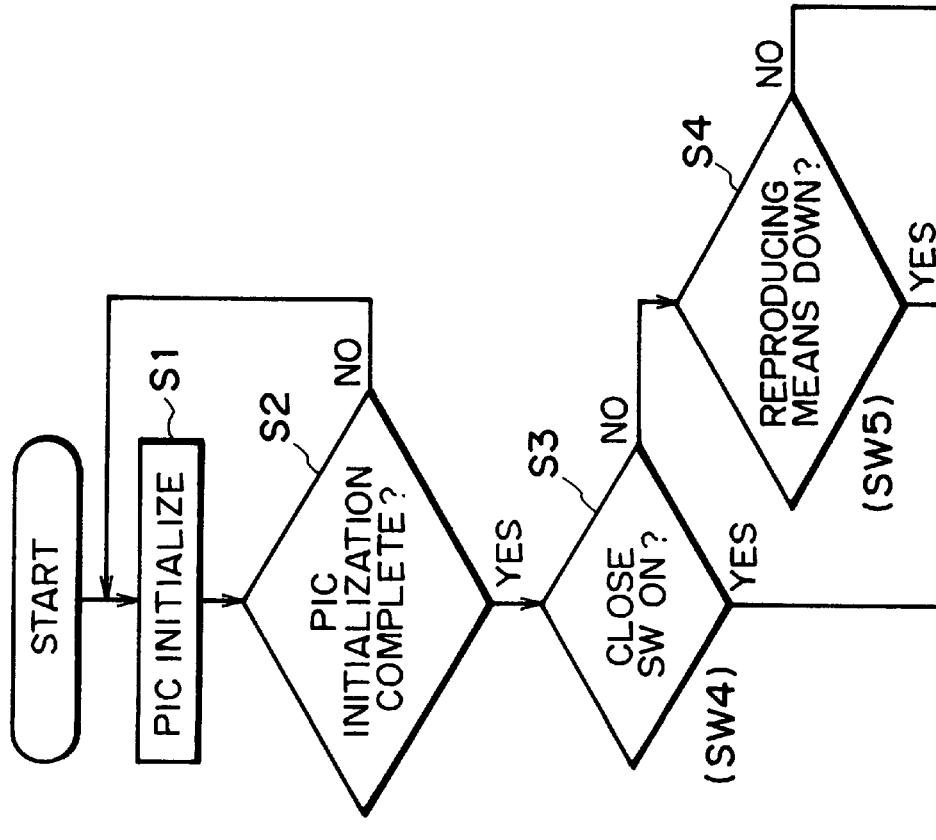

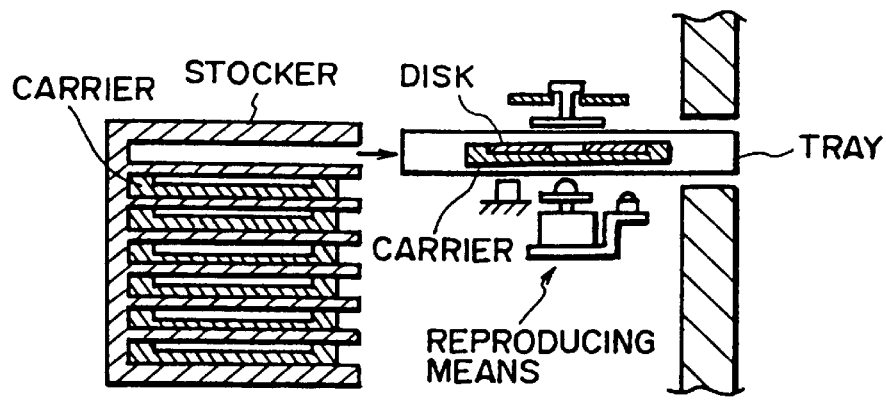
FIG.32A
PRIOR ART
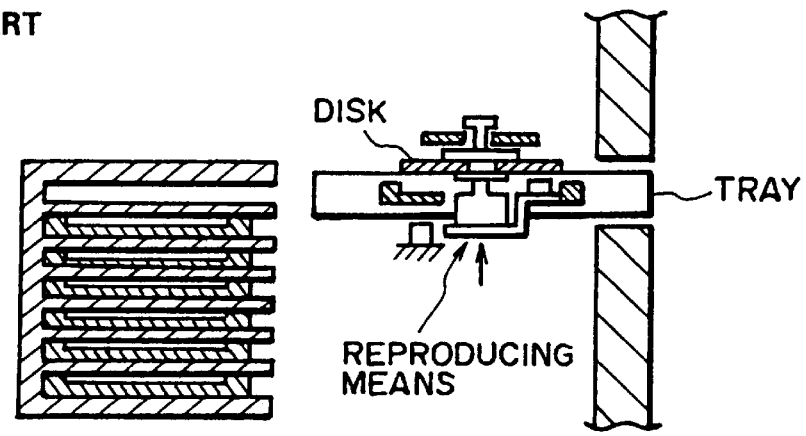
FIG.32B
PRIOR ART
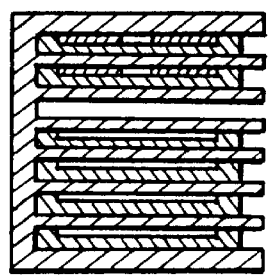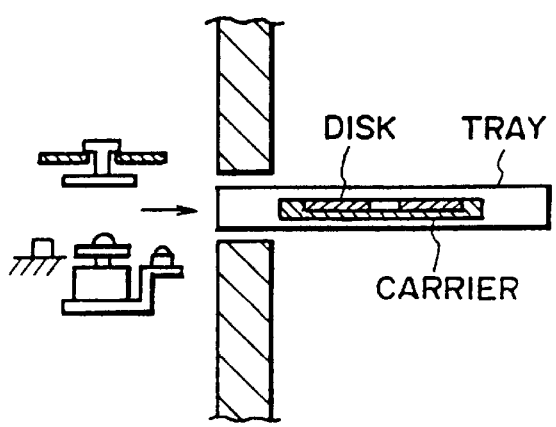
FIG.32C
PRIOR ART

MULTIPLE DISKS EXCHANGE CONTROLLER

TECHNICAL FIELD OF THE INVENTION

The present invention relates to a recording medium reproducing apparatus having a disk exchanger, and more particularly to a control operation of transporting a disk between the inside of a disk stocker and the outside of an apparatus housing and between the inside of the disk stocker and a reproducing position.

RELATED BACKGROUND ART

As a conventional disk reproducing apparatus having a disk exchanger, a disk reproducing apparatus such as shown in FIG. 29 is known in which a magazine having disks inserted therein is loaded in the apparatus and a desired disk in the magazine is selected and reproduced. Such a disk reproducing apparatus requires an expensive magazine, posing a problem of high cost of the whole apparatus.

A disk pick-up position storage device for a disk reproducing apparatus using such a magazine, proposed by the present applicant in Japanese Utility Model Application No. 4-55178 (Japanese Utility Model Laid-open Publication No. 6-11154), is shown in FIGS. 30 and 31. This disk pick-up storage device is used for placing a disk at the original position in the magazine after the disk was pulled out of the magazine or the power is turned off after the disk was pulled out of the magazine. In FIG. 30, reference numeral 101 represents a magazine which has shelves for accommodating six disk trays 102, 102, . . . . The magazine 101 accommodates six disk trays on which disks 103 are placed. A case for mounting the magazine 101 and a lock mechanism are mounted on a chassis.

Reference numeral 104 represents a loading tray which is used for placing thereon a disk not accommodated in the magazine 101, can accommodate only one disk, and is transported between the inside of an apparatus housing shown in FIG. 30 and a position protruded from the housing. A loading chassis is constituted of a loading chassis top plate 106a on which a loading chassis left guide 106b and a loading chassis right guide 106c are fixedly mounted. This loading chassis is supported by pantograph mechanisms 107, 107, . . . movably up and down relative to the chassis.

A pin 106d is mounted upright on the loading chassis left guide 106b and engages with a cam groove 108a of a loading chassis lift plate 108 which is supported by a side chassis 105 and is made to become capable of sliding back and forth by an unrepresented gear meshing with a rack 108b. As the loading chassis lift plate 108 moves, the loading chassis moves up and down. The positions of shelves of the magazine 101 and the shelf of the loading tray 104 can be detected by light of a photo interrupter passing through holes 108c, 108c, . . . of the loading chassis lift plate 108.

An upward open recess of a loading arm 109 is fitted in a T-character shaped portion 106f at the bottom of the loading chassis left guide 106b, the loading arm 109 being made to become capable of sliding back and forth along the loading chassis left guide 106b and also to move up and down together with the loading chassis. A rod 110 engaging with a notch of the loading arm 109 is supported by the side chassis 105 and made movable back and forth by an unrepresented drive mechanism.

The loading arm 109 also engages with a notch of the disk tray 102 and driven by the rod 110 back and forth to move the disk tray 102 from the magazine 101 or loading tray 104 into grooves 106g of the loading chassis.

As shown in FIGS. 30 and 31, an engaging piece 111 is supported by the side chassis 105 and is made to become capable of sliding up and down. The engaging piece 111 is energized upward by a coil spring 112. The engaging piece 111 usually abuts against an unrepresented stopper. In this state, recesses 111a, 111a, . . . are at the height positions of the disk trays. The height position of the uppermost disk tray in the magazine 101 corresponds to an upper space of the engaging piece 111 and that of the lowermost disk tray in the loading tray 104 corresponds to a lower space of the engaging piece 111.

A stopper piece 113 is supported by the loading chassis left guide 106b and is made to become capable of sliding. The stopper piece 113 is energized by a coil spring 114 and is usually in tight contact with a step 106h of the loading chassis left guide 106b. In this state, a stopper portion 113a of the stopper piece 113 does not protrude into the recess 111a, and the engaging piece 111 is still even if the loading chassis moves up and down.

As the loading arm 109 moves the disk tray into the loading chassis, the rear end of the loading arm 109 pushes the lower front end (hidden in FIG. 31) of the stopper piece 113 and makes the stopper piece 113 protrude into the recess 111a.

Next, as the loading chassis moves down to a playing position, the loading chassis puts a disk on the disk tray on an unrepresented turntable, and a clamper 106e supported in a floating state by the loading chassis top plate 106a clamps the disk onto the turntable to start playing the disk.

In moving the disk back to the original position after playing, the loading chassis moves up together with the engaging piece 111. At this raised position, a projection 111b of the engaging piece 111 makes a lever 115 rotatively supported by the side chassis 105 rotate in the clockwise direction to activate a microswitch 116 so that a rise end position (a position slightly lower than the position where the disk tray is moved from the magazine into the loading chassis) is detected. However, if the disk in the loading tray 104 is played, since the stopper piece 113a is lower than the engaging piece 111, the engaging piece 111 will not move down even if the stopper piece 113 moves down together with the loading chassis and the microswitch 116 is in the activated state. Therefore, the rise end position of the loading chassis can be detected by an output of the microswitch 116.

Immediately after the rise end position (position at which the microswitch 116 is activated) of the loading chassis is detected, light passing through the hole 108c, 108c, . . . of the loading chassis lift plate 108 is detected by the photo interrupter and the loading chassis lift plate 108 is stopped. When the loading chassis lift plate 108 is stopped, the disk tray in the loading chassis is at the original height position of the magazine. As the loading arm 109 moves, the disk tray is moved back to the original position of the magazine. More specifically, the loading chassis moves up together with the stopper piece 113 and loading arm, and when it comes to the height same as the disk dray 102 in the loading tray, it stops. Then, the loading arm 109 moves the disk tray 102 into the loading chassis. At this time, the stopper portion 113a of the stopper piece 113 enters the recess 111a at the height position same as the engaging piece 111, or moves lower than the engaging piece. In this state, the engaging piece 111 is the highest rise position and the microswitch 116 is in the activated state (on-state).

As the loading chassis lowers together with the engaging piece 111 in order to lower the disk to the playing position, the microswitch 116 turns off. In moving the disk back into the magazine after the reproduction, the loading chassis moves up and the microswitch 116 turns on. At this time, the loading chassis is nearly at the height position before it lowers. Immediately after the microswitch 116 turns on, the photo interrupter detects the hole 108c of the loading chassis lift plate 108 so that the loading chassis stops rising.

If the engaging piece 111 does not lower (when the disk tray 102 in the loading tray 104 is moved into the loading chassis) even if the loading chassis lowers the disk to the reproduction position, the microswitch 116 maintains on. In this case, the loading chassis stops rising at a timing when the photo interrupter first detects the hole 108c of the loading chassis lift plate 108 as the loading chassis moves up.

In playing another disk, the loading chassis is moved up and down in the state that the loading arm 109 moves into the magazine, to engage with the disk tray of the disk next played and pull the disk out of the magazine.

If the microswitch 116 is not in the activated state when the power of the disk reproducing apparatus is turned on, the loading chassis is raised after interrupter detects the hole 108c of the loading chassis lift plate 108. If the photo interrupter does not detect the hole 108c of the loading chassis lift plate 108 even if the microswitch 116 is activated, the loading chassis is raised until the hole 108c is detected. Thereafter, the initial state of the apparatus is recovered by moving the disk dray to the original position in the magazine by moving the loading arm 109.

With this disk reproducing apparatus, the loading arm 109 pulls only one disk out of the magazine. The pull-out position is stored as the position where the stopper piece 113 engages with the recess 111a, 111a, . . . of the engaging piece 111. However, this method of mechanically storing the pull-out position of the disk in the magazine poses a problem of a need of the above-described complicated mechanism.

As another disk reproducing apparatus having a disk exchanger, a disk reproducing apparatus disclosed in Japanese Patent Laid-open Publication No. 4-38673 is shown in FIG. 32. A stocker shown in FIG. 32 stores a plurality of carriers each capable of placing a disk thereon. The stocker is moved up and down by stocker transport means to a height position allowing a desired carrier to be pulled out by a tray. Specifically, the stocker is moved by a distance corresponding to the number of shelves for housing carriers.

The tray is transported between a load position shown in FIGS. 32(a) and 32(b) and an eject position shown in FIGS. 32(c). The carrier having a desired disk placed thereon is placed on a tray at the load position, and the disk is clamped by clamping means to reproduce the disk as shown in FIG. 32(b). As the tray with the carrier moves from the position shown in FIG. 32(a) to the position shown in FIG. 32(c), the carrier on the tray is exposed to the outside of the apparatus housing. In this state, the disk on the carrier is exchanged or a new disk is placed on the carrier. As the tray with the carrier moves from the position shown in FIG. 32(c) to the position shown in FIG. 32(a) and the carrier on the tray is moved back to the stocker, the disk can be exchanged or a new disk can be added to the apparatus. This disk reproducing apparatus is advantageous over a conventional disk reproducing apparatus with an exchanger in that the disk magazine is not used. The disk magazine is expensive, and if it is dismounted from the apparatus and placed at a different position, it takes some time to locate this disk magazine. This is inconvenient to use.

However, this disk reproducing apparatus disclosed in the above-described Japanese Patent Laid-open Publication No. 4-38673 has only one means for pulling a carrier out of the stocker. Therefore, a disk in the stocker cannot be exchanged during the reproduction when the carrier is at the position of reproducing means.

The invention has been made under the above circumstances. It is an object of the present invention to provide a disk reproducing apparatus capable of housing a disk in a stocker even if the power is turned off while the disk is pulled out of the stocker, without using complicated mechanisms and a battery backed up memory or the like.

It is another object of the present invention to provide means for housing a disk in a stocker without using a battery backed up memory or the like, for a disk reproducing apparatus having first and second disk transport means allowing disks to be exchanged during reproduction.

It is a further object of the invention to provide a disk reproducing apparatus capable of exchanging disks in a stocker even during reproduction of a disk.

A disk reproducing apparatus of this invention comprises: a stocker capable of accommodating a plurality of disks; reproducing means for reproducing a disk; transport means for transporting a disk between the stocker and the outside of an apparatus housing or the reproducing means; position aligning means for aligning relative positions of a disk and the transport means; and control means, wherein if the power of the apparatus is turned on while the transport means transports one disk to the outside of the apparatus housing and another disk to a reproduction position, the control means controls to accommodate the one disk in the stocker and thereafter accommodate the other disk in the stocker.

According to another aspect of the invention, upon a request of transporting another disks to the reproducing means under the conditions that the transport means transports one disks to the outside of the housing, the control means controls to accommodate the one disk at the outside of the housing in the stocker and thereafter transport the other disk to the reproducing means.

According to another aspect of the invention, upon an instruction of accommodating at least one of one disk and another disk in the stocker under the conditions that the transport means transports the one disk to the outside of the housing and the other disk to the reproducing means, the control means controls to first accommodate the disk transported later, into the stocker.

BRIEF DESCRIPTION OF THE DRAWINGS

FIGS. 14(a) and 14(b) are partial plan views illustrating the operation of the disk reproducing apparatus according to the embodiment of the invention.

FIG. 14(c) is a cross sectional view taken along line C—C of FIG. 14(a).

FIG. 14(d) shows the details of a D portion shown in FIG. 14(a).

FIG. 14(e) shows the details of an E portion shown in FIG. 14(b).

FIG. 16(a) is a plan view showing part of the disk reproducing apparatus according to the embodiment of the invention.

FIG. 16(b) a plan view showing another part of the disk reproducing apparatus in the state shown in FIG. 16(a).

FIG. 16(c) is a cross sectional view taken along line C—C of FIG. 16(b).

FIG. 17(a,b,c) is a diagram showing another state of the part shown in FIG. 16.

FIG. 18(a,b,c) is a diagram showing another state of the part shown in FIG. 16.

FIG. 20(a) is a schematic diagram showing the structure of the disk reproducing apparatus according to the embodiment of the invention.

FIG. 20(b) is a schematic diagram showing the partial outline structure of the disk reproducing apparatus.

FIG. 20(c) is a diagram showing another state of the part shown in FIG. 20(b).

FIGS. 29 to 32(a,b,c) are diagrams showing examples of the structures of disk reproducing apparatus according to conventional techniques.

DESCRIPTION OF THE EMBODIMENTS

Figure 1:
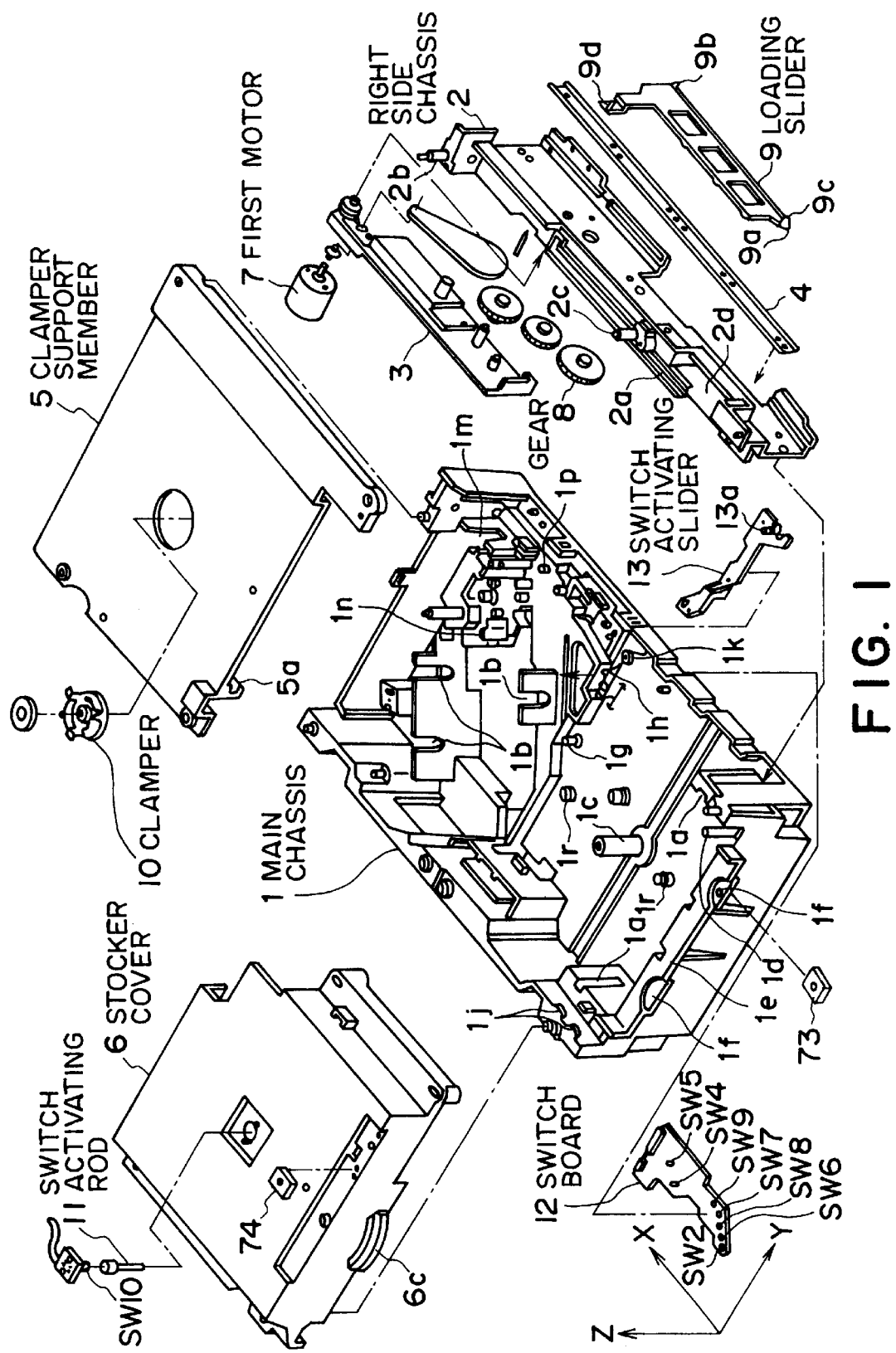
FIG. 1 is a broken perspective view showing part of a disk reproducing apparatus according to an embodiment of the invention.

Disk reproducing apparatus according to the embodiments of the invention will be described with reference to the accompanying drawings. First, with reference to FIG. 20, the outline of the disk reproducing apparatus of the embodiments will be described. Obviously, as a recording medium, various types of media can be used. In the following embodiments, a compact disk (merely called a disk) is used as a recording medium. A disk is housed in a shelf at each stage (in the embodiment, six stages) of a stocker 21 disposed in a housing. First transport means transports a disk between the inside of the housing 21 and the outside of the housing, and second transport means transports a disk between the inside of the housing and reproducing means. The first and second transport means are not driven in an up/down direction.

The stocker 21 is moved up and down in order to align a desired disk with a pull-out height of the first or second transport means. As shown in FIG. 20(a), the first transport means is disposed lower than the second transport by one stage of disk in the stocker 21. FIG. 20(b) shows the state where the stocker 21 is moved to the lowest position. In this state, the first transport means couples to the uppermost disk, and the second transport means is at the position corresponding to an upper space of the stocker 21. FIG. 20(c) shows the state where the stocker 21 is moved to the highest position. In this state, the second transport means couples to the lowermost disk, and the first transport means is at the position corresponding to a lower space of the stocker 21. Although the stocker 21 has six stages of shelves for housing disks, it is driven by a stroke corresponding to seven stages of disks. Reproducing means is driven in an up/down direction. As a disk is transported by the second transport means to a reproducing position, the reproducing means rises to clamp the disk between a turntable and a clamper. Then, the disk is rotated to reproduce it.

In order to confirm a normal position of disks in the stocker 21, a disk position detecting member 26 is provided being inserted into the center holes of disks in the stocker 21, this member 26 being movable up and down and always energized upward by the force of a spring. The up/down stroke of the disk position detecting member 26 corresponds to two stages of disk. When the disk position detecting member 26 is at the lower position, the disk to be transported by the first or second transport means does not interfere with the disk position detecting member 26. After the disk is transported into the stocker 21 by the first or second transport means, the disk position detecting member 26 rises. Disks not inserted with the disk position detecting member 26 are inserted by a member fixed at the higher position than the disk position detecting member 26.

A second motor drives the second transport means and stocker moving means, and a first motor drives the first transport means and disk clamping means of the disk reproducing means. The rotation force of the second motor is switched between the second transport means and the stocker moving means.

The first transport means pulls a disk out of the stocker 21 in the direction opposite to the disk reproducing means. Therefore, irrespective of whether the disk reproducing means holds a disk or not, disks in the stocker 21 can be exchanged or a new disk can be added to the stocker 21.

Figure 2:
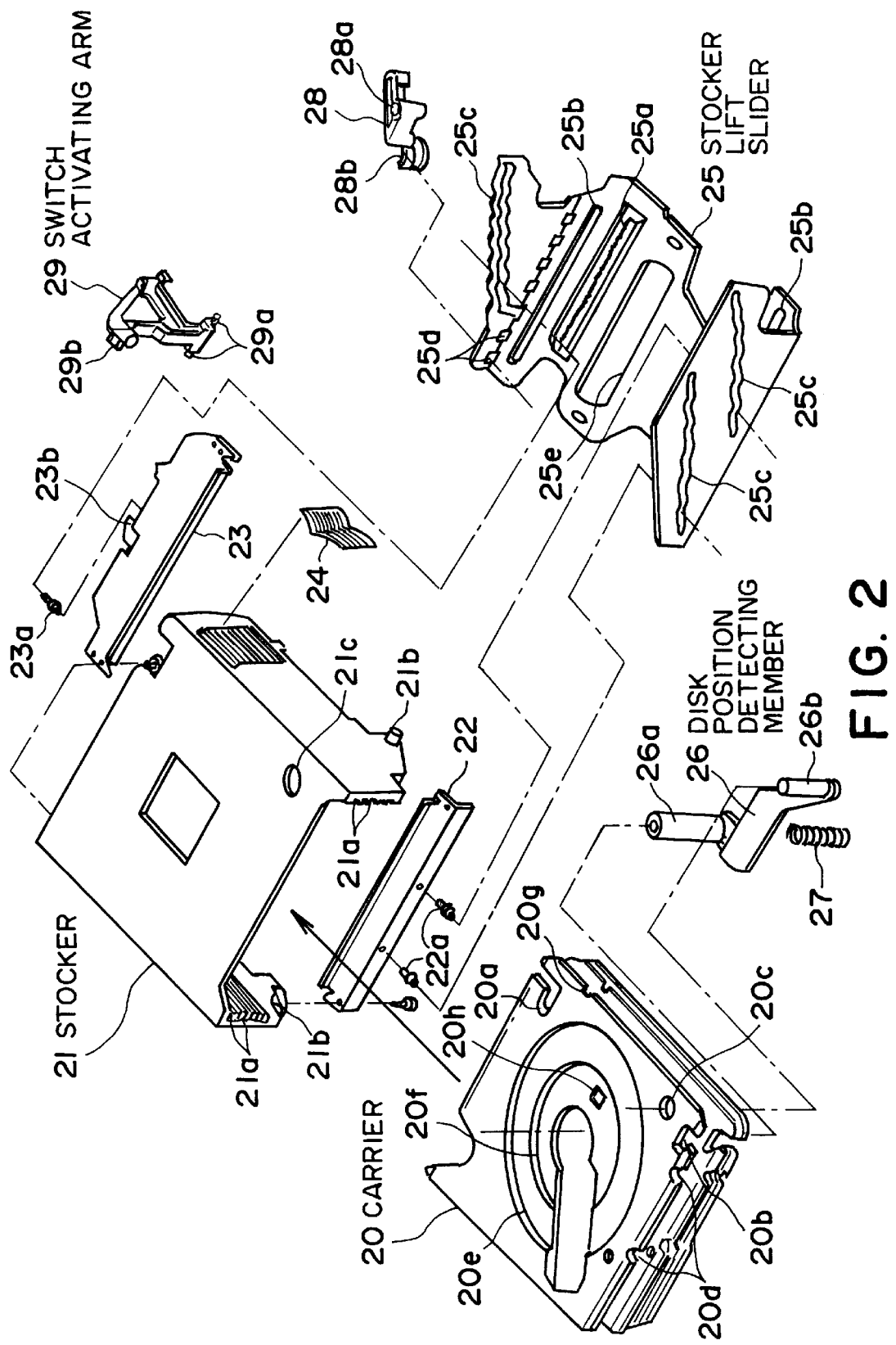
FIG. 2 is a broken perspective view showing part of the disk reproducing apparatus according to the embodiment of the invention.
Figure 3:
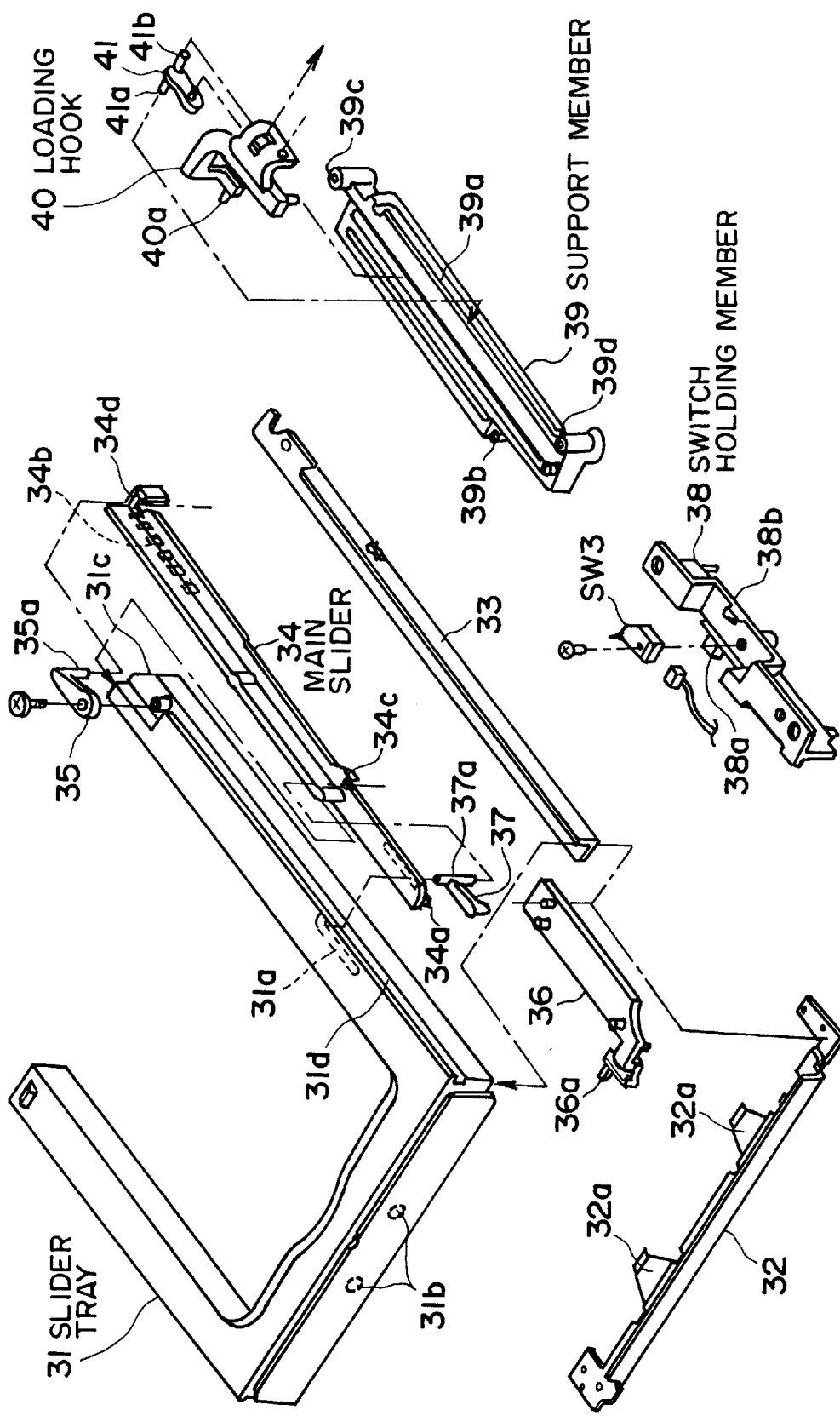
FIG. 3 is a broken perspective view showing part of the disk reproducing apparatus according to the embodiment of the invention.
Figure 4:
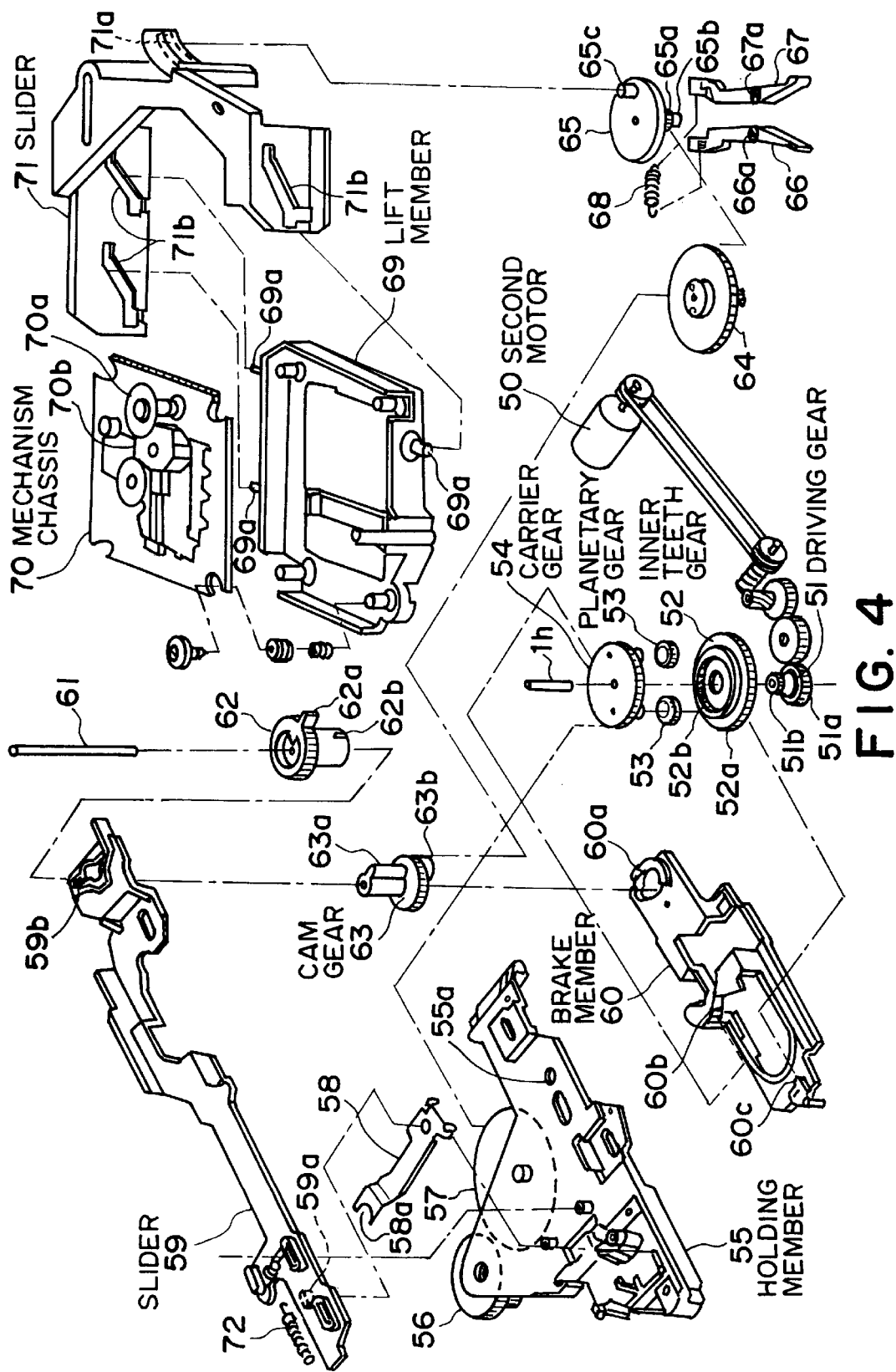
FIG. 4 is a broken perspective view showing part of the disk reproducing apparatus according to the embodiment of the invention.

Next, with reference to FIGS. 1 to 19, the details of the embodiment will be described. FIGS. 1 to 4 are broken perspective views showing parts of a disk reproducing apparatus according to an embodiment of the invention. The positive directions of X-, Y-, and Z-axes shown in FIG. 1 are called in the following description, back, right, and up directions, respectively. The postures of each component shown in FIGS. 2 to 4 are the same as those shown in FIG. 1.

A main chassis 1 shown in FIG. 1 supports all components shown in FIGS. 1 to 4. A right side chassis 2 is fixed to the right side of the main chassis 1. A gear train support member 3 and a guide plate 4 are fixed to the right side chassis 2. A first motor 7 is fixedly mounted on the gear train support member 3. The gear train support member 3 supports a transmission mechanism constituted of belts and idler gears. The transmission mechanism transmits a rotation force of the first motor 7 to a gear 8 supported by the gear train support member 3. A clamper support member 5 is fixed to the upper back surface of the main chassis 1 and holds a damper 10 rotatively. A guide groove 5a for guiding a carrier 20 shown in FIG. 2 is formed in the left side inner wall of the clamper support member 5. Switches SW2, and SW4 to SW9 are mounted on a switch board 12 which is fixed to the bottom surface of the main chassis 1.

Figure 5:
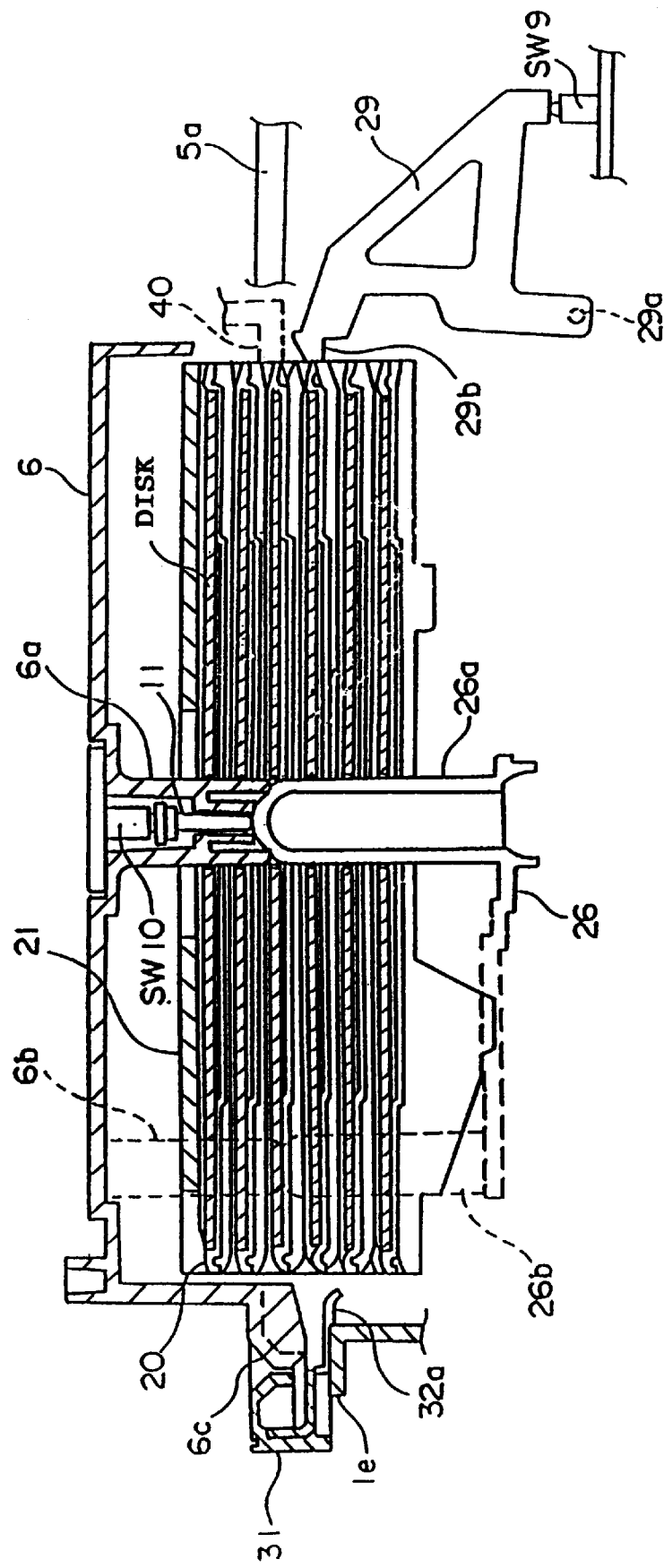
FIG. 5 is a cross sectional view showing part of the disk reproducing apparatus according to the embodiment of the invention, the cross section being stepwise so as to take the view along the centers of a stocker cover 6 and a disk position detecting member 26.
Figure 6:
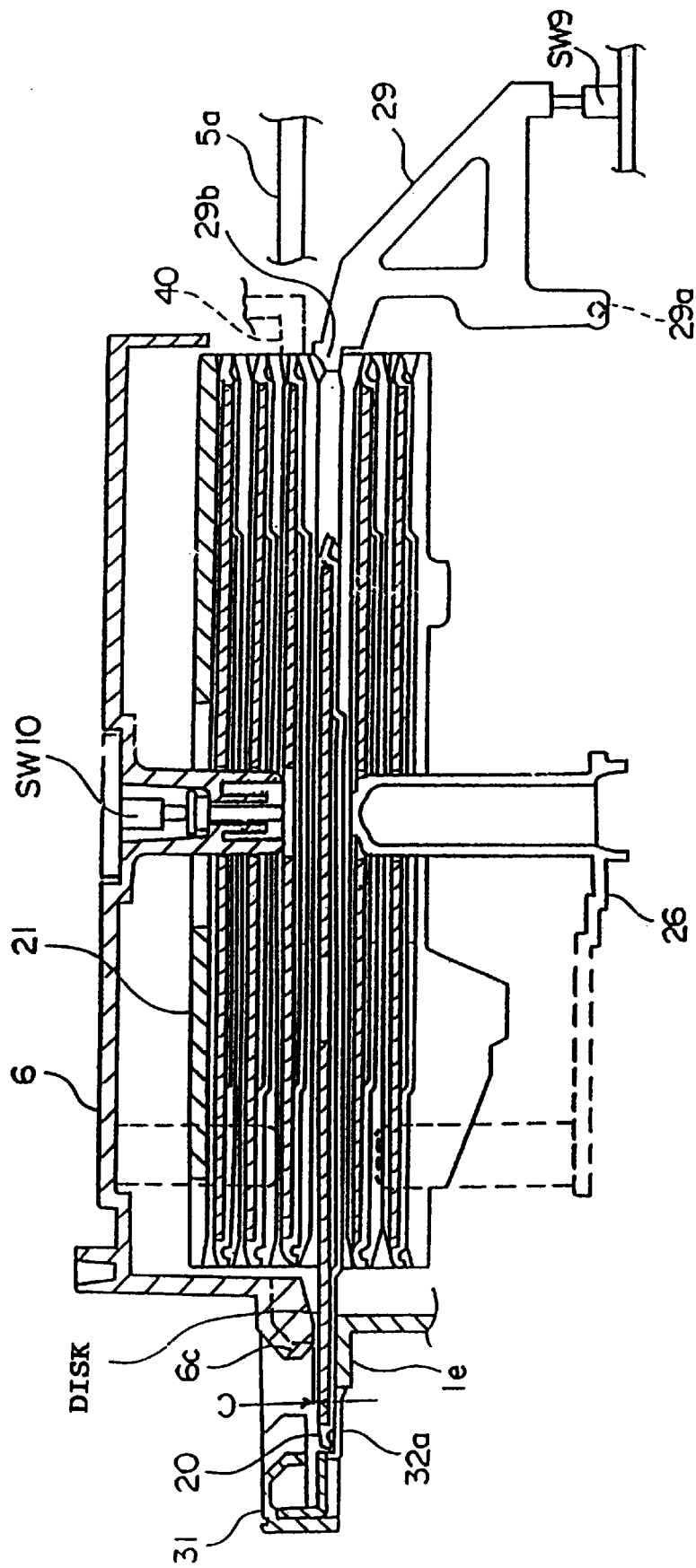
FIG. 6 is a cross sectional view showing another state of the portion shown in FIG. 5.

A stocker cover 6 for covering the upper portion of the stocker 21 shown in FIG. 2 is fixed to the upper front surface of the main chassis 1. The positional relationship between the stocker cover 6 and stocker 21 is detailed in FIGS. 5 and 6. FIG. 5 is a cross sectional view showing the state that all carriers 20 are housed in the stocker 21. FIG. 6 is a cross sectional view showing the state that a carrier 20 is partially pulled out of the stocker 21. As shown, a switch activating rod 11 is supported movably up and down by a cylindrical portion 6a extending downward from the central area of the stocker cover 6. A switch SW10 is fixed to the stocker cover 6 via a board, facing the switch activating rod 11.

At the front right of the stocker cover 6, a stopper rod 6b is provided at the position corresponding to a hole 21c of the stocker 21 shown in FIG. 2. The height of the lower end of the stopper rod 6b is generally flush with the height of the lower end of the cylindrical portion 6a. A stopper portion 6c is provided at the lower front of the stocker cover 6. A light receiving element 74 is mounted via a board on the stopper cover 6. A light emitting element 73 projecting light toward the light receiving element 74 is mounted via a substrate on the main chassis 1. As detailed in FIG. 14(c), a loading slider 9 engages with a guide plate 4 and is supported by the guide plate 4 to become capable of sliding back and forth. At the lower left side of the loading slider 9, a rack 9a is mounted which meshes with outer teeth 52a of an inner teeth gear 52 shown in FIGS. 4 and 15. The rack 9a meshes with the inner teeth gear so that the loading slider 9 is driven in back and forth upon rotation of the inner teeth gear 52. As shown in FIG. 14(a), projections 13a, 13a of a switch activating slider 13 engage with elongated holes 1s, 1s of the main chassis 1. The switch activating slider 13 is supported movably right and left by the main chassis 1. As shown in FIGS. 14(a), 14(d), 14(b), and 14(e) in detail, the projections 13a of the switch activating slider 13 abut against projections 9b, 9c of the loading slider 9. As shown in FIGS. 14(a) and 14(d), as the loading slider 9 moves forward, i.e., toward the carrier housing position, the projection 9b of the loading slider 9 pushes via the projection 13a the switch activating slider 13 to the left to activate the switch SW8. As shown in FIGS. 14(b) and 14(e), as the loading slider 9 moves backward, i.e., toward the loading position, the projection 9c of the loading slider 13 pushes via the projection 13a the switch activating slider 13 to the right to activate the switch SW7. While the projection 9b or 9c of the loading slider 9 does not push the projection 13a of the switch activating slider 12, the switch activating slider 13 is at an intermediate position because it is pushed by the switches SW7 and SW8. The carrier 20 shown in FIG. 2 can place thereon a disk through position alignment by a large diameter disk recess 20e or small diameter disk recess 20f. A hole 20c is formed at the outer position of the large diameter recess 20e of the carrier 20. This hole 20c, when the carrier 20 is housed in the stocker 21, is formed at the position corresponding to a hole 21c of the stocker 21. Therefore, the above-described stopper rod 6b of the stocker cover 6 is inserted into the hole 20c of the carrier 20 via the hole 21c of the stocker 21. Grooves 21a, 21a, ... formed in the inner wall of the stocker 21 support the carriers 20, the stocker 21 housing six carriers 20. As stated earlier, the stocker 21 has the hole 21c formed at the position corresponding to the hole 20c of the carrier 20 in the stocker 21. A hole 20h is partially formed in the small diameter disk recess 20f of the carrier 20. As will be later described, this hole 20h allows light from the light emitting element 73 to pass therethrough while the carrier 20 moves from the outside of the housing to the inside of the stocker 21.

A plate spring 24 fixed to the stocker 21 shown in FIG. 2 engages with a recess 20g of the carrier 20 to thereby lightly position the carrier 20. A first hook engaging notch 20b of the carrier 20 engages with a first hook 36a of a carrier pull-out member 36 shown in FIG. 3. Therefore, the carrier 20 can be transported by the carrier pull-out member 36 between the stocker 21 and the outside of the housing.

A second hook engaging notch 20a of the carrier 20 engages with a second hook 40a of a loading hook 40 shown in FIG. 3. Therefore, the carrier 20 can be transported by the loading hook 40 between the stocker 21 and the reproducing position. The carrier pull-out member 36 and its drive mechanism constitute the first transport means, and the loading hook 40 and its drive mechanism constitute the second transport means.

Shafts 21b, 21b of the stocker 21 are fitted in vertical grooves 1a, 1a formed in the main chassis 1. A front plate 22 and a back plate 23 are fixed to the lower portion of the stocker 21. Shafts 22a, 22a are mounted upright on the front plate 22. A shaft 23a is mounted upright on the back plate 23, and a tongue 23b is provided.

A guide rod 1c of the main chassis 1 is inserted into an elongated hole 25e of a stocker lift slider 25, and shafts 1r, 1r of the main chassis 1 are inserted into grooved 25b, 25b. Therefore, the stocker lift slider 25 is supported by the main chassis 1 to become capable of sliding to the right and left.

The stocker lift slider 25 is provided with stepwise grooves 25c, 25c, . . . having seven horizontal portions and a rack 25a.

Figure 15:
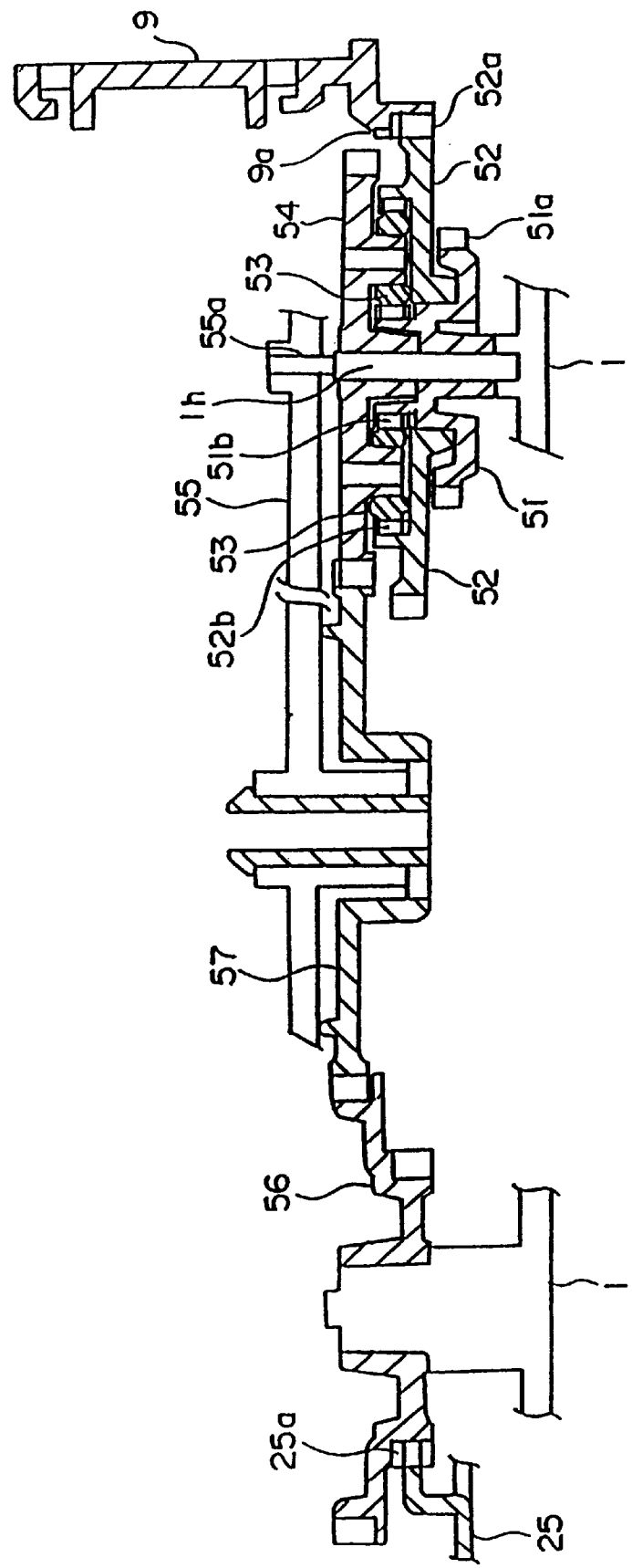
FIG. 15 is a cross sectional view taken along the centers of gears, illustrating a meshing relationship between gears of the disk reproducing apparatus according to the embodiment of the invention.

The rack 25a of the stocker lift slider 25 meshes with a gear 56 shown in FIGS. 4 and 15. The shafts 22a, 22a of the front plate 22 and the shaft 23a of the back plate 23 are inserted into the stepwise grooves 25c, 25c, . . . Specifically, as the gear 56 rotates, the stocker lift slider 25 moves to move the stocker 21 up and down. The stocker lift slider 25 and its drive mechanism constitute stocker transport means.

When the stocker 21 is at the home position which is the lowest position, the tongue 23b activates the switch SW2. In this state, the carrier 20 on the shelf of the stocker 21 at the uppermost stage is at the position where the carrier 20 is moved to the outside of the housing by the carrier pull-out member 36. Whether there is a carrier 20 at the position (in this case, on the shelf at the uppermost stage) corresponding to the carrier pull-out member 36 can be detected by the switch SW9 to be later described. Also in this state, a loading hook 40 is at the upper space over the uppermost stage.

A switch activating arm 28 is supported rotatively via its hole 28a by a shaft 1g of the main chassis 1. The right side end of the switch activating arm 28 abuts against the switch SW6. The switch activating arm 28 is pushed by the switch SW6 and energized in the counter-clockwise direction. A projection 28b of the switch activating arm 28 is at the position corresponding to holes 25d, 25d, . . . of the stocker lift slider 25. As the stocker lift slider 25 moves and each time it passes near the hole 25d, the projection 28b enters the hole 25d so that the switch activating arm 28 swings. The switch SW6 turns on and off each time the stocker lift slider 25 passes near the hole 25d.

A pitch between the holes 25d and 25d is equal to a motion distance of the carrier by one stage. The position of the stocker 21 at the lowermost position is represented by "0", and while the stocker 21 is raised, the stocker position is counted up each time the switch SW6 turns on and off, whereas while the stocker 21 is lowered, the stocker position is counted down each time the switch SW6 turns on and off. In this manner, a control circuit can store the position of the stocker 21.

The stocker can be raised to a height corresponding to seven shelf stages from the home position. When the stocker is at the uppermost position, the lowermost shelf is at the position where a carrier can be pulled into and out of the stocker by the loading hook 40. Specifically, the carrier pull-out member 36 is at the lower space under the lowermost shelf. As described earlier, in order to temporarily stop the stocker when the shelf at each stage of the stocker is at the height position corresponding to the loading hook 40 and carrier pull-out member 36, the seven horizontal portions are formed on the stepwise groove 25c of the stocker lift slider 25.

The disk position detecting member 26 has rod-like protrusions 26a and 26b whose insides are hollow portions opening at the bottoms. The guide rods 1c and 1d of the main chassis 1 shown in FIG. 1 engage with the hollow portions of the rod-like protrusions 26a and 26b so that the disk position detecting member 26 can move up and down.

A compression coil spring 27 squeezed between the main chassis 1 and disk position detecting member 26 energizes upward the disk position detecting member 26. A recess 58a formed at the end portion of an arm 58 shown in FIG. 4 couples to the base portion of the rod-like protrusion 26a of the disk position detecting member 26. The arm 58 makes the disk position detecting member 26 move up and down.

FIG. 5 shows the state that the disk position detecting member 26 is at the raised position, and FIG. 6 shows the state that the disk position detecting member 26 is at the lowered position.

As the disk position detecting member 26 rises, the switch activating rod 11 activates the switch SW10. The rod-like protrusion 26a is inserted into the center holes of disks in the stocker 21, and the rod-like protrusion 26b is inserted into the holes 20c of the carriers 20 in the stocker 21.

A switch activating arm 29 shown in FIGS. 2, 5, and 6 is rotatively supported via its shaft 29a by a boss 1h formed on the main chassis 1 at the central bottom surface on the slightly right side thereof, the lower back portion of the switch activating arm 29 abutting against the switch SW9 and being energized by this switch SW9. A protrusion 29b of the switch activating arm 29 is at the position corresponding to the stage where the carrier pull-out member 36 pulls out the carrier 20, and is in contact with the back portion of the carrier 20 at this position.

The switch activating arm 29 therefore rotates when the carrier 20 is pulled out of the stocker or moved back to the stocker, and turns on and off the switch SW9 which detects that the carrier 20 is moved back to the stocker 21 by the carrier pull-out member 36. The switch SW9 also detects whether there is a carrier at the stage where the carrier pull-out member 36 operates.

A switch holding member 38 shown in FIG. 3 is fixed in such a manner that a channel-shaped projection 38b formed on the bottom of the member 38 is fitted in a channel-shaped recess 2d formed on the front portion of the right side chassis 2 shown in FIG. 1. A slider tray 31 is supported by the main chassis 1 and switch holding member 38 to become capable of sliding back and forth. Specifically, the projection 38a of the switch holding member 38 engages with a groove 31d formed in the right side wall of the slider tray 31, and a projection 1j formed in the left side wall of the main chassis 1 engages with a groove 31e formed in the left side wall of the slider tray 31.

Figure 7:
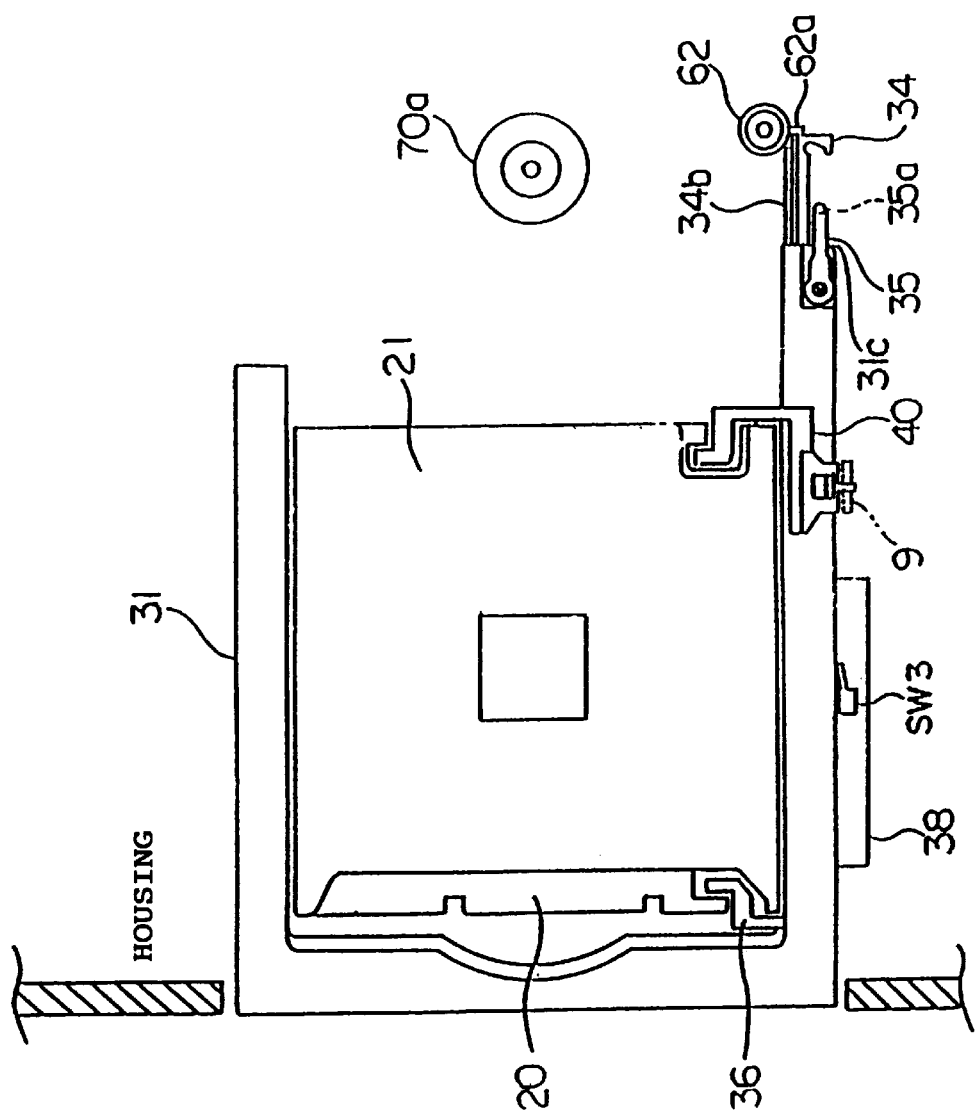
FIG. 7 is a plan view showing part of the disk reproducing apparatus according to the embodiment of the invention.
Figure 8:
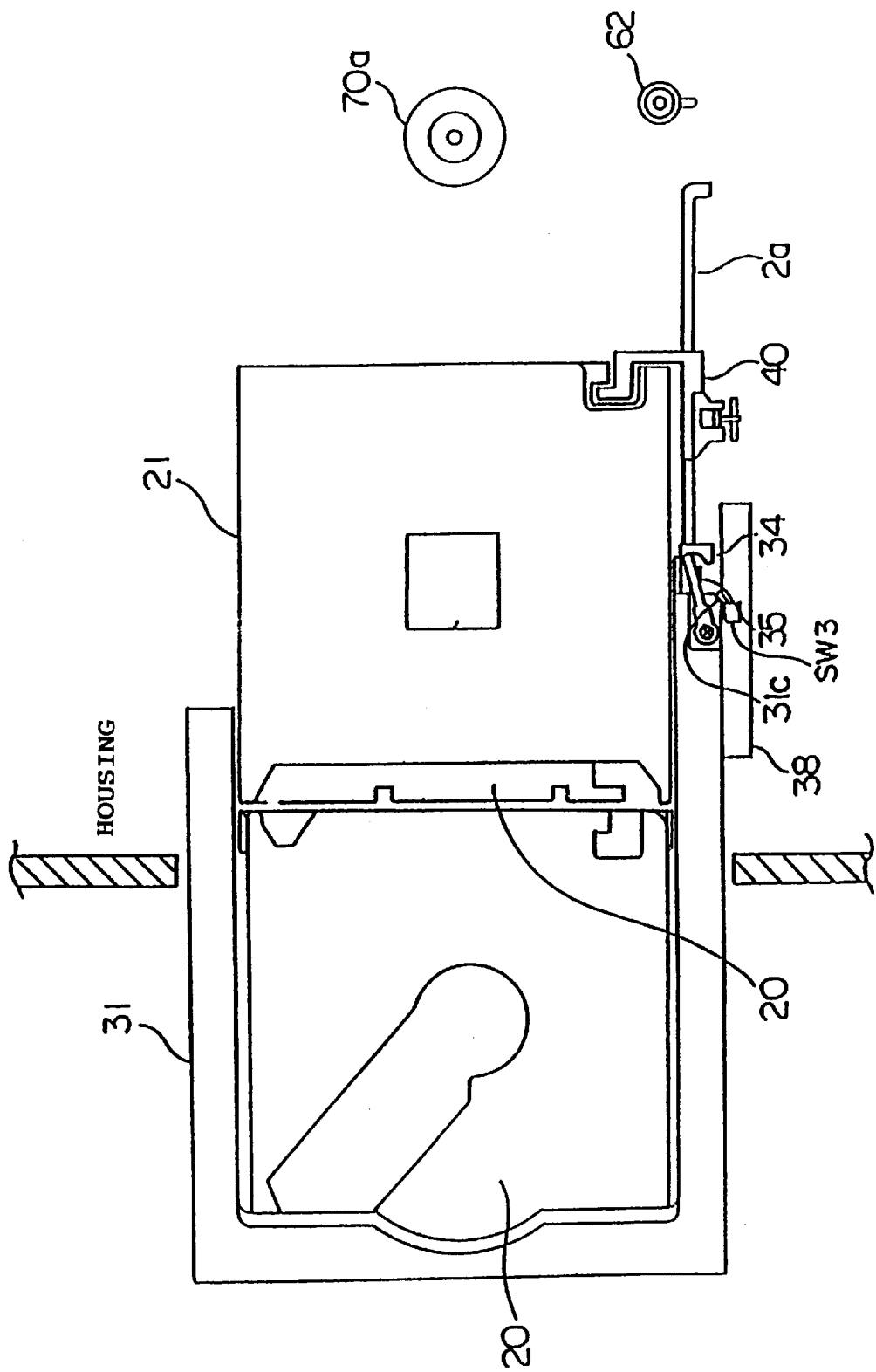
FIG. 8 is a plan view showing another state of the portion shown in FIG. 7.

The positional relationship between the slider tray 31 and stocker 21 is shown in FIGS. 7 and 8. FIG. 7 shows the state that the carrier 20 is out of the housing. As shown, the slider tray 31 is formed and disposed so as to sandwich the stocker between the right and left sides thereof. Therefore, the slider tray 31 can forme therein grooves 31e and 31d serving as a support portion long in the right and left direction. The stocker can therefore be supported stably to become capable of sliding back and forth, and as will be later described, a main slider 34 and carrier pull-out member 36 can be stably supported. Furthermore, since the slider tray 31 accommodated in the housing surrounds the stocker 21, a stroke of the slider tray 31 can be made large in a narrow space so that the carrier 20 can be pulled out to a long distance.

An operating piece of the switch SW3 fixed to the switch holding member 38 is pushed to the right side surface of the slider tray 31, when the slider tray 31 is accommodated in the housing as shown in FIG. 7 or while it is transported in a motion stroke (to the front direction) to the outside of the housing. As shown in FIG. 8, at the end of the motion stroke of the slider tray 31 to the outside of the housing, a slanted back portion 31c of the slider tray 31 faces the operating piece of the switch SW3 to release the pressure of the operating piece. Namely, the switch SW3 detects the open position of the slider tray 31.

A guide plate 33 shown in FIG. 3 is fixed to the bottom of the slider tray 31. The guide plate 33 and slider tray 31 support the guide plate 33 and slider tray 31 to be made capable of moving back and forth, by sandwiching the guide plate 33 and slider tray 31.

A rack 34a is formed on the bottom of the main slider 34 in the back and forth direction. The rack 34a meshes with the gear 8 shown in FIG. 1. Therefore, as the first motor 7 rotates in the normal and reverse directions, the main slider 34 moves back and forth. The main slider 34 moves the slider tray 31 and carrier pull-out member 36 and rotates a gear 62 shown in FIGS. 4, 7, and 8. Specifically, as the main slider 34 moves back, the slider tray 31 can be moved to the inside of the housing. The main slider 34 can move back further after the slider tray is moved to the inside of the housing. The main slider 34 moved back further rotates a gear 62 shown in FIGS. 4, 7, and 8. The carrier pull-out member 36 shown in FIGS. 3 and FIGS. 9 to 11 rotatively supports a rotary member 37. The shaft 37a of the rotary member 37 engages with a J-shaped groove 31a of the slider tray 31 and can engage also with a recess 34c of the main slider 34. The carrier pull-out member 36 shown in FIGS. 3 and FIGS. 9 to 11 rotatively supports a rotary member 35. The shaft 35a of the rotary member 35 engages with a J-shaped groove 2a of the right side chassis 2 shown in FIG. 1 and can engage also with a recess 34d of the main slider 34.

Figure 9:
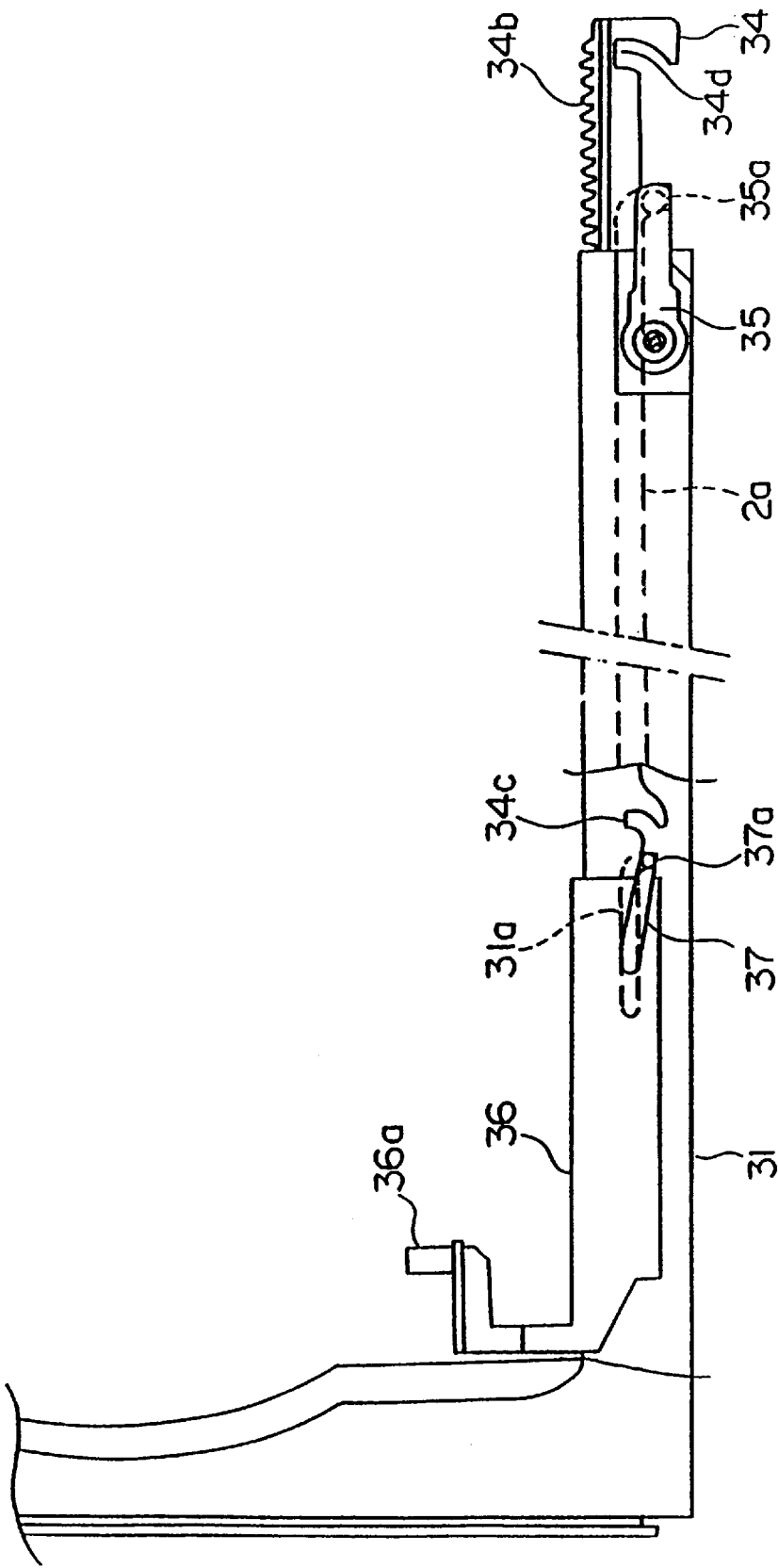
FIG. 9 is a plan view partially broken showing part of the disk reproducing apparatus according to the embodiment of the invention.
Figure 10:
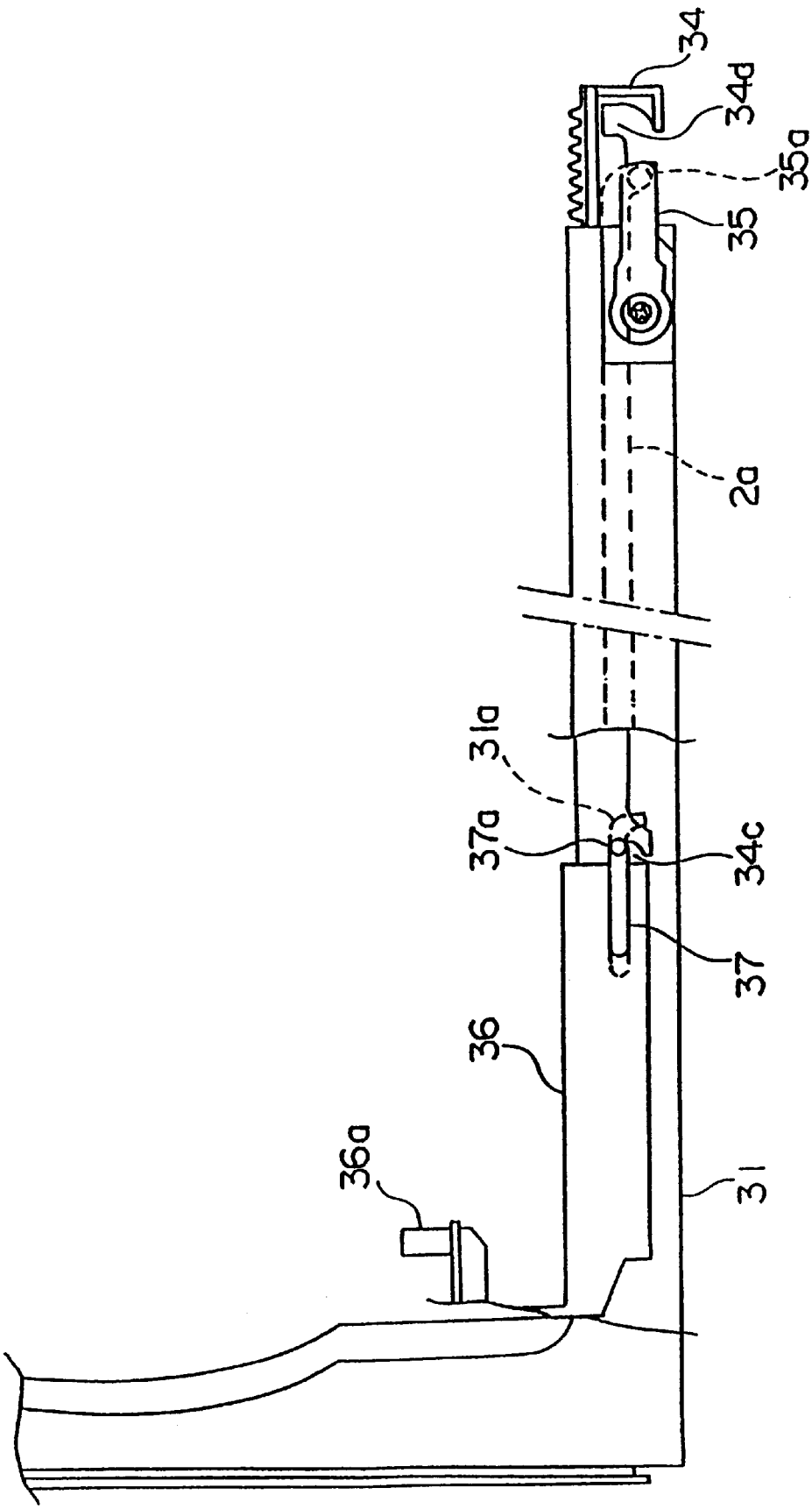
FIG. 10 is a plan view showing another state of the portion shown in FIG. 9.
Figure 11:
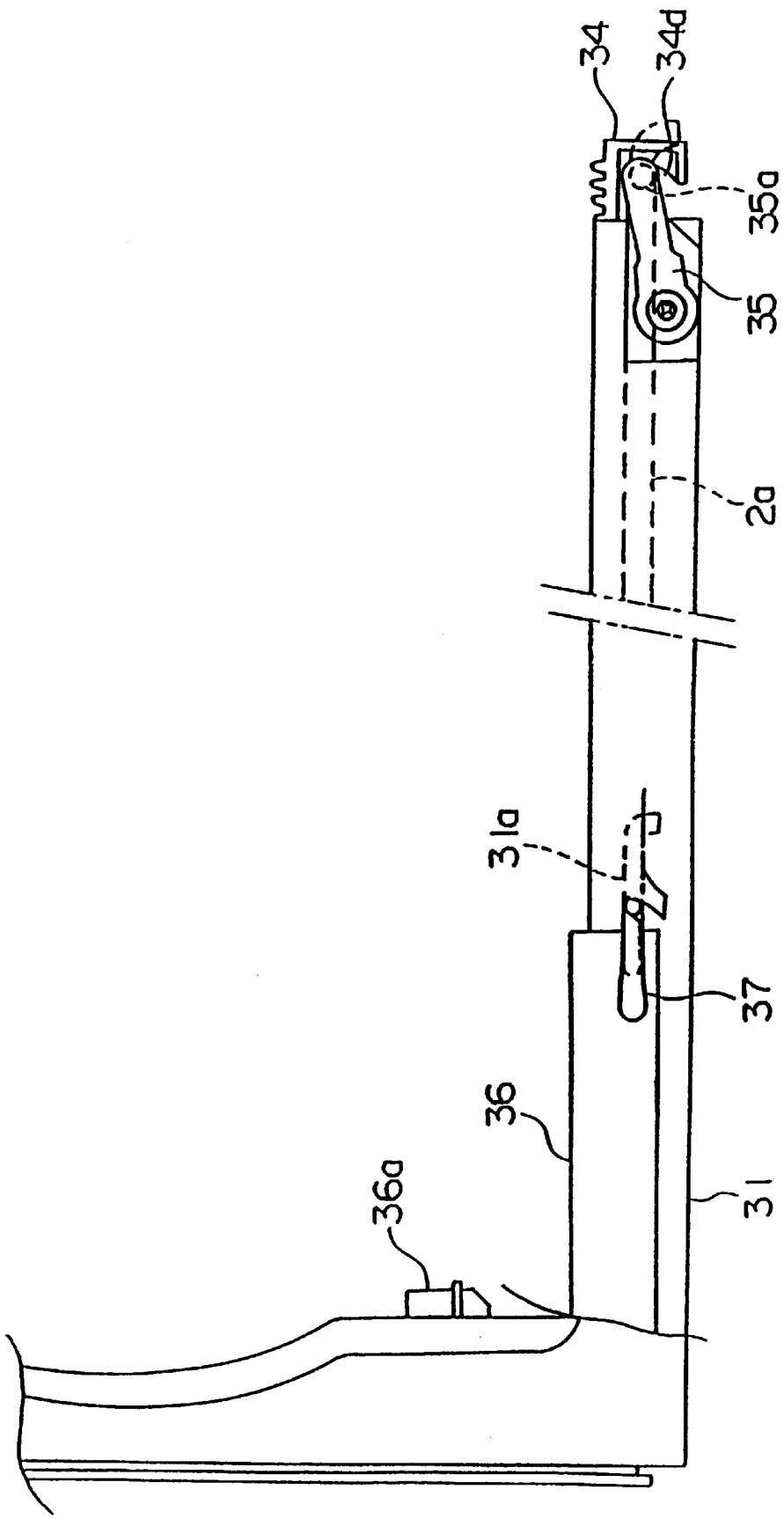
FIG. 11 is a plan view showing another state of the portion shown in FIG. 9.

FIGS. 9 to 11 show a change in the relationship of the relative position of the main slider 34, slider tray 31, and carrier pull-out member 36. As shown in FIG. 9, while the main slider 34 moves back, the shaft 37a engages with the right protrusion of the J-shaped groove 31a and does not engage with the recess 34c. Therefore, the main slider 34 does not drive the carrier pull-out member 36. Also in this case, the shaft 35a engages with the right protrusion of the J-shaped groove 2a and does not engage with the recess 34d. Therefore, the main slider 34 does not drive the slider tray 31. Namely, in the state shown in FIG. 9, although the main slider 34 moves, the carrier pull-out member 36 and main slider 34 will not move.

As the main slider 34 moves forth to the position shown in FIG. 10, the recess 34c makes the shaft 37a enter therein, the shaft 37a engages with a straight portion of the J-shaped groove 31a, and the carrier pull-out member 36 is driven. In this state, the main slider 34 is not moved as yet.

As the main slider 34 moves forth to the position shown in FIG. 11, the recess 34d makes the shaft 35a enter therein, the shaft 35a engages with a straight portion of the J-shaped groove 2a, and the slider carrier pull-out member 36 is driven. The main slider 34 first moves forth to thereafter move forth the slider tray 31 along with the carrier pull-out member 36.

As the carrier pull-out member 36 moves forth, the carrier 20 in the stocker 21 is pulled forth to place the end portion thereof on tongues 32a and 32a of a lower plate 32 fixed to the slider tray 31. FIG. 6 shows the state that the carrier 20 is placed on the tongues 32a and 32a of the lower plate 32. As shown in FIG. 6, in the state while the carrier 20 is pulled out of the stocker 21 toward the outside of the housing, a distance C between the disk on the carrier 20 and the stopper portion 6c of the stocker cover 6 is made smaller than the thickness of the disk.

In the state that the slider tray 31 is in the housing, the tongues 32a and 32a are fitted in recesses 1f and 1f formed in the upper frame 1e of the main chassis 1 and are near at the carrier 20 in the stocker 21. As the carrier 20 is pulled out in the above manner, recesses 20d and 20d at the top end of the carrier 20 engage with protrusions 31b and 31b of the slider tray 31 so that the right and left positions at the top end of the carrier 20 can be fixed. The rear potion of the carrier 20 is supported by the upper frame 1e of the main chassis 1, and the right and left positions of the carrier 20 are determined by the right and left vertical surfaces of the upper frame 1e.

A shaft 61 shown in FIG. 4 is supported by being fitted in a hole 1p formed in the bottom of the main chassis shown in FIG. 1 and in a hole formed on the left bottom on a slightly back side of a support member 39 shown in FIG. 3. The shaft 61 rotatively supports a cam gear 63 and the gear 62. A protrusion 63a of the cam gear 63 is fitted in a recess 62b of the gear 62 so that the cam gear 63 and gear 62 rotate together. As described previously, the gear 62 is rotated by the main slider 34.

FIG. 7 shows the state that the main slider 34 starts rotating the gear 62. As the main slider 34 moves back, its rear end pushes the protrusion 62a of the gear 62 so that the gear 62 rotates and meshes with the rack 34b of the main slider 34. Since the positional relationship between the gear 62 and main slider 34 is constant, the gear 62 smoothly meshes with the rack 34b.

Figure 12:
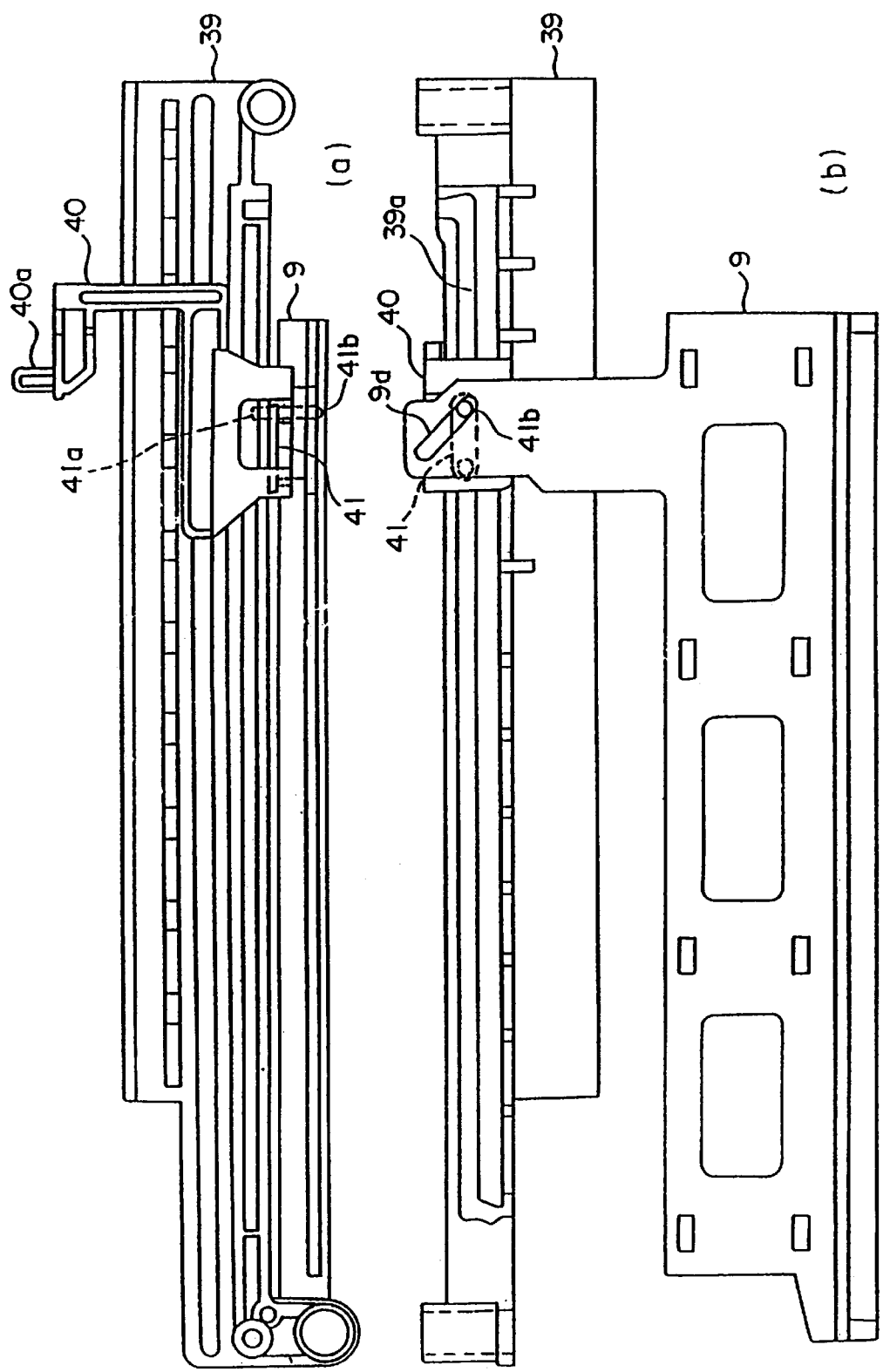
FIG. 12(a) is a plan view showing part of the disk reproducing apparatus according to the embodiment of the invention.
FIG. 12(b) is a side view showing the part shown in FIG. 12(a).

The support member 39 show in FIG. 3 is fixed to the right side chassis 2 in such a manner that shafts 2b and 2c of the right side chassis 2 are fitted in holes 39c and 39d of the support member 39. A guide groove is formed in the left side wall of the support member 39 for guiding the carrier 20 together with the guide groove 5a of the damper holding member 5 described previously with reference to FIG. 1. A rotary member 41 is rotatively supported by the loading hook 40. The shaft 41a of the rotary member 41 engages with the L-shaped groove 39a of a support member 39. The shaft 41b engages with a slanted groove 8d of the loading slider 9 shown in FIG. 1. In the above manner, the loading hook 40 is supported by the support member 39 and loading slider 9 to be movable to back and forth. FIG. 12 shows an assembly state of the support member 39, loading slider 9, loading hook 40, and rotary member 41.

Figure 13A:
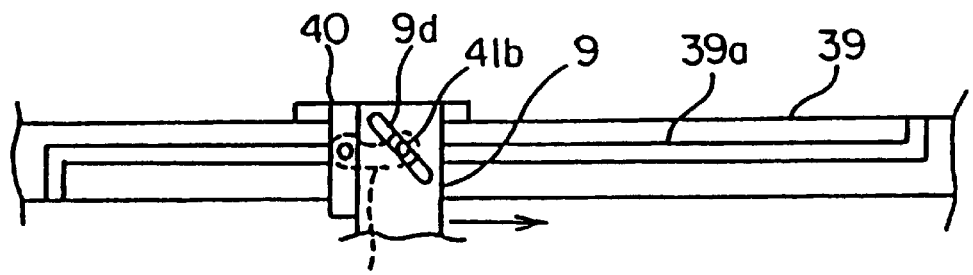
FIG. 13(a,b,c,) is a partial side view illustrating the operation of the disk reproducing apparatus according to the embodiment of the invention.

FIG. 13 shows the state that the loading slider 9 drives the loading hook 40. FIG. 13(a) shows the intermediate drive state of the loading hook 40. In this state, the shaft 41a (hidden by the shaft 41b) engages with the horizontal portion of the L-shaped groove 39a, the rotary member 41 does not rotate, and the loading hook 40 moves together with the loading slider 9.

Figure 13B:
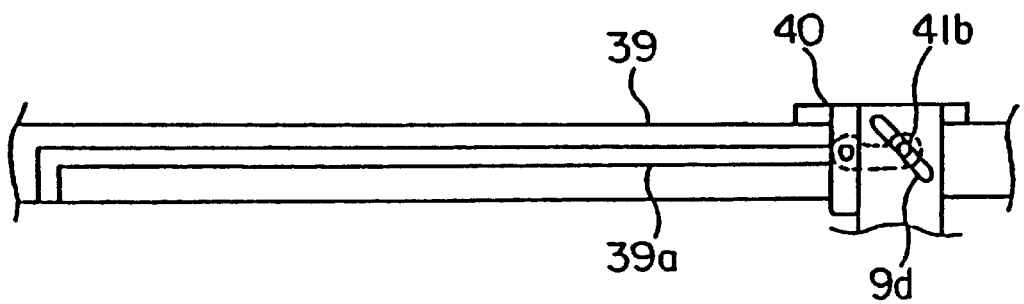
Figure 13C:
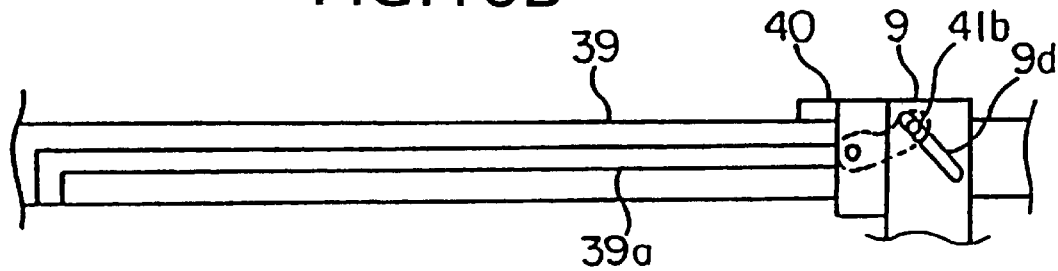

FIG. 13(b) shows the state that the shaft 41a engages with the end of the horizontal portion of the L-shaped groove 39a, and FIG. 13(c) shows the state that the loading slider 9 is at the end of the motion stroke. While the loading slider 9 moves from the position shown in FIG. 13(b) to the position shown in FIG. 13(c), the rotary member 41 rotates and the loading hook 40 moves less. Even if the loading slider 9 bounds and the motion position changes, the stop position of the loading hook 40 is stabilized.

As described earlier, the second hook engaging notch 20a of the carrier 20 engages with the second hook 40a of the loading hook 40. Therefore, as the loading hook 40 moves back, the carrier 20 in the stocker 21 is pulled out by the loading hook 40. The carrier is guided by the guide groove 5a of the clamper support member 5 previously described with FIGS. 1 and 3 and the guide groove 39b of the support member 39, and transported to the position just above the turntable 70a shown in FIG. 4 and FIGS. 7 and 8, i.e., to the loading position. As above, since the carrier 20 is guided by the members fixed to the main chassis 1, it does not vibrate during transportation and can be pulled in the guide portions reliably.

The carrier 20 is transported between the stocker 21 and turntable 70a as the loading slider 9 moves as in the above manner. The end of the motion stroke of the loading slider 9 is detected by the switches SW7 and SW8 as previously described with FIG. 14. Both the carrier pull-out member 36 and loading hook 40 pull the carrier 20 out of the stocker 21, and the height positions thereof differ by one stage of carrier as shown in FIGS. 20 and 6 so that the carrier 20 will not be pulled by both the carrier pull-out member 36 and loading hook 40.

A driving gear 51, inner teeth gear 52, and carrier gear 54 shown in FIGS. 4 and 15 are rotatively supported by the shaft 1h. The upper and lower ends of the shaft 1h are supported by a hole 1k of the main chassis 1 shown in FIG. 1 and a hole 55a of a holding member 55 fixed to the main chassis 1. The holding member 55 is fixed to the main chassis 1 in such a manner that the hole 55a faces the hole 1k of the main chassis 1.

Planetary gears 53, 53 rotatively supported by the shaft of the carrier gear 54 mesh with the inner teeth 52b of the inner teeth gear 52 and a sun gear 51b formed on the driving gear 51. These gears constitute a planetary gear mechanism.

A second motor 50 is fixed to a boss 1m of the main chassis 1 shown in FIG. 1. A deceleration mechanism driven by the second motor meshes with a large gear 51a of the driving gear 51 so that the second motor 50 rotatively drives the driving gear 51. A rotation force of the second motor 50 is transmitted to the carrier gear 54 while the inner teeth gear 52 stops and to the inner teeth gear 52 while the carrier gear 54 stops.

As described earlier, the outer teeth 52a of the inner teeth gear 52 mesh with the rack 9a of the loading slider 9a (as shown in FIG. 15) to drive the loading slider 9. The carrier gear 54 is coupled to the rack 25a of the stocker lift slider 25 via gears 56 and 57 rotatively supported and sandwiched between the main chassis 1 and holding member 55, to thereby drive the stocker lift slider 25.

A slider 59 shown in FIG. 4 and FIGS. 16 to 18 is supported at the upper portion of the holding member 55 via a plurality of elongated holes extending in the back and forth direction to become capable of sliding back and forth, and is energized forth by an extension coil spring 72. A cam follower 59b of the slider 59 engages with a protrusion 63a of a cam gear 63, and the slider is driven back and forth by the cam gear 63. A cam-shaped protrusion 59a formed on the bottom of the slider 59 engages with a fringe of an arm 58 rotatively supported by the holding member 55 to rotate the arm 58 as shown in FIGS. 16 to 18.

Specifically, the main slider 34 raises and lowers the disk position detecting member 26 shown in FIG. 2, and raises it while the carrier 20 is not transported into and from the stocker 21. For example, if an 8-cm disk is accommodated in the stocker 21 of the carrier 20 in a displaced manner, the displaced disk hinders the rise of the disk position detecting member 26 and the switch SW10 does not operate so that displacement of a disk or carrier can be detected.

The disk position detecting member 26 is formed to have a lift stroke corresponding to the carriers 20 engaged with the carrier pull-out member 36 and loading hook 40. In other words, the lift stroke of the disk position detecting member corresponds to two stages of carrier.

While the disk position detecting member 26 rises, the rod-like protrusions 26a and 26b are inserted into the center holes of disks in the stocker and into the holes 20c of the carriers 20. In this case, the rod-like protrusion 26a abuts against the switch activating rod 11 to activate the switch SW10, whereas the rod-like protrusion 26b abuts against the stopper rod 6b on the back surface of the stopper cover.

There is a case wherein while the stocker 21 is raised, the carrier 20 is above the loading hook 40. In this case, because of the lift stroke of the disk position detecting member 26, the rod-like protrusion 26a is not inserted into the center holes of disks above the loading hook 40, and the rod-like protrusion 26a is not inserted into the holes 20c of the carriers 20. In such a case, however, as shown in FIG. 5, the cylindrical portion 6a is inserted into the center holes of disks above the loading hook 40, and the stopper rod 6b on the back surface of the stocker cover is inserted into the holes 20c of the carriers 20. Therefore, irrespective of the position of the stocker 21, even if vibration is applied while the disk position detecting member 26 rises, the carrier 20 and the disk on the carrier will not be displaced.

As shown in FIG. 6, as the disk position detecting member 26 lowers, the carrier 20 in the stocker 21 can be pulled out in respective directions by the carrier pull-out member and loading hook 40. Even if vibration is applied while the disk position detecting member 26 lowers, the carrier 20 will not be displaced because the carrier pull-out member 36 and loading hook 40 engage with the carriers 20 at the position where the rod-like protrusion 26b is not present.

If tapers are provided at the top ends of the rod-like protrusions 26a and 26b of the disk position detecting member 26, a small position displacement of a disk or carrier can be corrected while the disk position detecting member 26 rises. It is therefore possible to prevent the carrier 20 from contacting the loading hook 40 or carrier pull-out member 36 while the stocker 21 is moved up and down.

A brake member 60 shown in FIG. 4 and FIGS. 16 to 18 is supported to become capable of sliding back and forth, by being sandwiched between the main chassis 1 and holding member 55. A cam follower 60a of the brake member 60 engages with the cam 63b of the cam gear 63, and the brake member 60 is driven back and forth by the cam gear 63. A protrusion 60b of the brake member 60 stops the carrier gear 54 and a protrusion 60c thereof stops the inner teeth gear 52.

As described earlier, while the carrier gear 54 is stopped, the inner teeth gear 52 is rotatively driven, and while the inner teeth gear 52 is stopped, the carrier gear 54 is driven. Therefore, in accordance with a motion of the brake member 60, the transmission destination of the rotation force of the second motor 50 is switched. Specifically, the main slider 34 switches the transmission destination of the second motor 50. The brake member 60, its drive mechanism, and the planetary gear mechanism constitute transmission switching means.

The cam gear 63 shown in FIG. 4 and FIGS. 16 to 18 meshes with a gear 64 rotatively supported by the chassis 1 on a slightly back right side thereof. The gear 64 meshes with teeth 65a formed on a rotary member 65 rotatively supported by a shaft in of the main chassis 1. The shaft 65c of the rotary member 65 engages with a J-shaped groove 71a of a slider 71 supported at the rear portion of the main chassis 1 to become capable of sliding. A radius of the arc portion of the J-shaped groove 71a is equal to the rotation radius of the shaft 65c so that the slider 71 moves or stops while the rotary member 65 rotates.

Shafts 69a, 69a, . . . of a lift member 69 engage with vertical guide grooves 1b, 1b, . . . of the main chassis 1 and slanted lift guide grooves 71b, 71b, . . . of the slider 71. Therefore, the lift member 69 is moved up and down by the main slider 34 via the gear 62 to slider 71. A mechanism chassis 70 is mounted on the lift member 69 by using springs and dampers.

A disk motor is fixed to the mechanism chassis 70, and the turntable 70a is fixed to the rotary shaft of the disk motor. An optical pickup 70b is mounted on the mechanism chassis 70 to be fed in the radial direction of the disk placed on the turntable 70a. When the optical pickup 70b is at the home position remotest from the turntable 70a, an unrepresented switch SW1 is activated and the home position of the optical pickup is detected.

As the mechanism chassis 70 rises and the turntable 70a rises, the disk on the carrier 20 is clamped by the turntable 70a and clamper 10 and rotatively driven by the disk motor. While the disk rotates, the optical pickup 70b is fed in the radial direction of the disk to reproduce signals recorded in the disk. Components mounted on the mechanism chassis 70, clamper 10, and drive mechanism for the mechanism chassis 70 constitute reproducing means.

Levers 66 and 67 shown in FIG. 4 and FIGS. 16 to 18 at the position near the rotary member 65 are rotatively supported by the main chassis 1 in such a manner that holes 66a and 67a of the levers engage with the shaft of the main chassis 1. The levers are energized by an extension coil spring 68 and the rear ends thereof abut against the cam 65b of the rotary member 65. The front ends thereof abut against the switches SW4 and SW5, respectively. As the rotary member 65 rotates, the levers 66 and 67 swing about the shaft fitted in the holes 66a and 67a. The levers 66 and 67 activate the switches SW4 and SW5. The switch SW4 turns on when the mechanism chassis 70 rises or immediately before it starts lowering, whereas the switch SW5 turns on when the mechanism chassis 70 lowers or immediately before it starts rising.

FIG. 16 shows the state before the cam gear 63 is rotated by the main slider 34. In this state, the disk position detecting member 26 is at the lower position and the inner teeth gear 52 is stopped by the brake member 60. The turntable 70a is at the raised position. The switches SW4 and SW5 are off.

FIG. 17 shows the state that the cam gear 63 is rotated by the main slider 34 to the intermediate position. In this state, the disk position detecting member 26 is at the raised position and the inner teeth gear 52 is stopped by the brake member 60. The turntable 70a is at the raised position. The switch SW4 is on and the switch SW5 is off.

FIG. 18 shows the state that the cam gear 63 is rotated by the main slider to the maximum rotation angle. In this state, the disk position detecting member 26 is at the lower position and the carrier gear 54 is stopped by the brake member 60. The turntable 70a is at the lower position. The switch SW4 is off and the switch SW5 is on.

Figure 19:
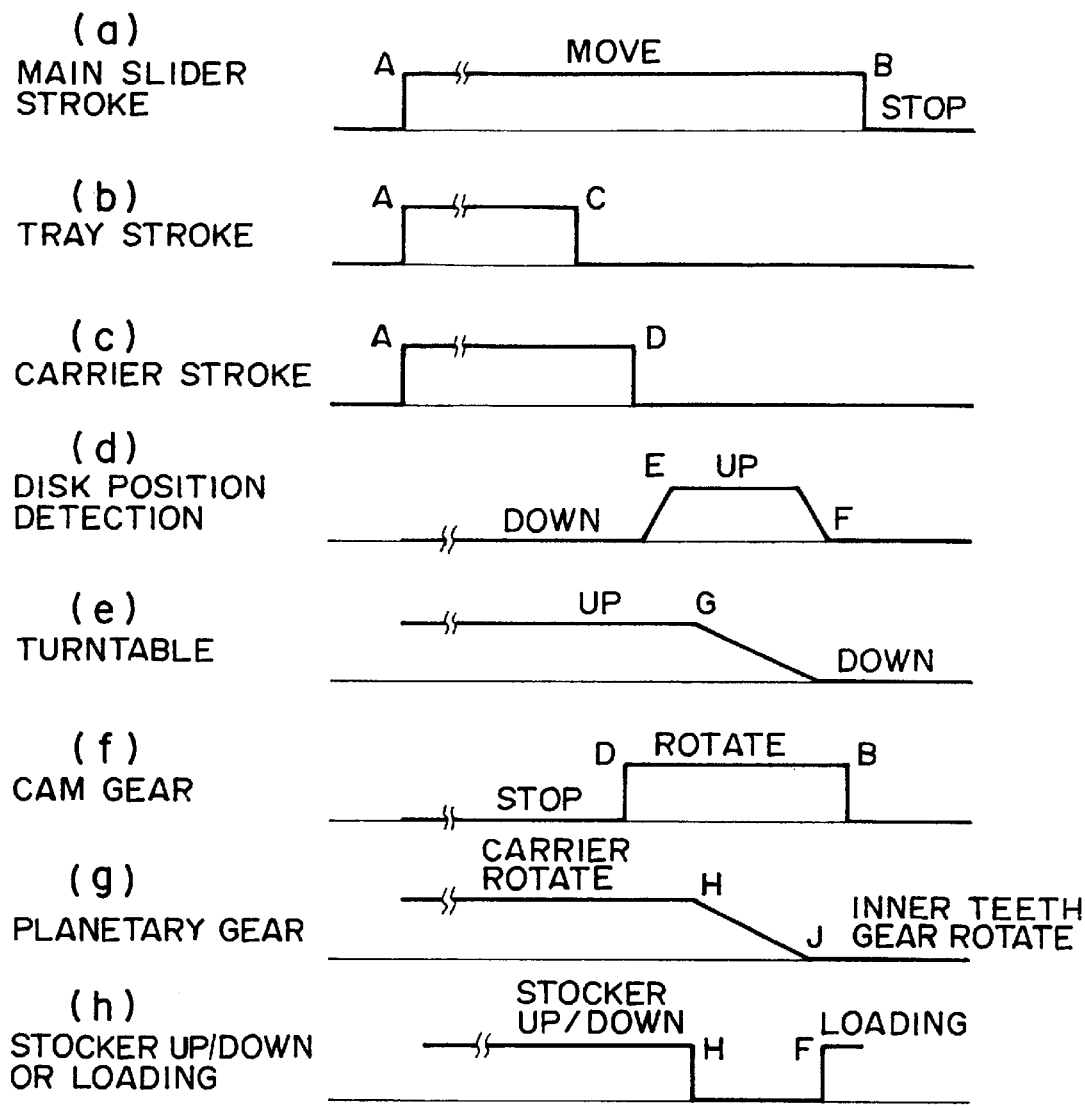
FIG. 19 is a chart illustrating the operation of the disk reproducing apparatus according to the embodiment of the invention.

FIG. 19 is a chart showing operation timings of each component. The abscissa of each of FIGS. 19(a) to 19(h) represents a main slider stroke of the same scale. The motion start point A of the main slider indicates that the main slider is at the most advanced position. The main slider motion end point B indicates that the main slider is at the most retracted position.

FIGS. 19(b) and 19(c) show the motion periods of the slider tray 31 and carrier 20, respectively. The motion end point C of the slider tray 31 is earlier in time than the motion end point D of the carrier 20. FIG. 19(d) shows the up/down state of the disk position detecting member 26. FIG. 19(e) shows the up/down state of the turntable. The point G of the raised position of the turntable is detected by the switch SW4 as described previously.

FIG. 19(f) shows the rotation state of the cam gear 63. FIG. 19(g) shows the rotation enabled state of the components of the planetary gear mechanism. Before the point H, the carrier gear can rotate and after the point J the inner teeth gear can rotate.

FIG. 19(h) shows the stocker up/down state and the motion state of the loading slider. Before the carrier gear rotation limit point H, the stocker is moved up and down. The loading slider is driven after the point F when the disk position detecting member 26 is lowered.

Figure 21:
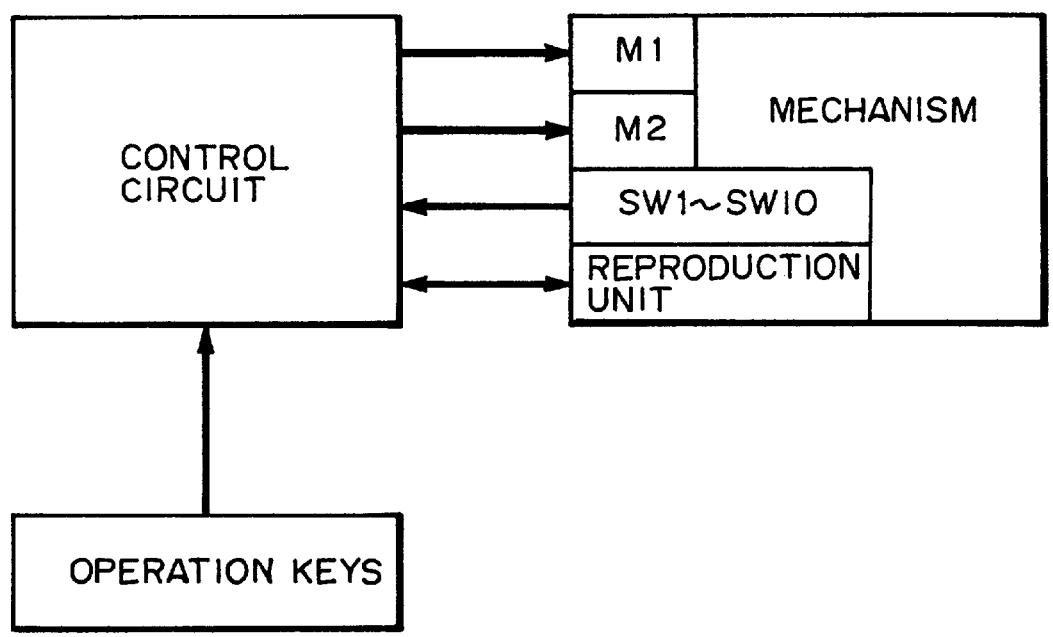
FIG. 21 is a block diagram of a control unit of the disk reproducing apparatus according to the embodiment of the invention.

Next, the operation of the disk reproducing apparatus constructed as above will be described. A control circuit shown in FIG. 21 has a microcomputer, a memory, input/output interface units, a drive circuit, and the like. Signals from operation keys, switches SW1 to SW10, and a reproducing unit are input to the control circuit to drive the first motor 7 (M1) and second motor 50 (M2), to output a play signal to the reproducing unit, and to drive the disk motor and a pickup feed motor of the reproducing unit.

The apparatus is controlled by the control circuit in accordance with the operations of the switches SW1 to SW10 and inputs from unrepresented keys mounted on a front panel of the housing. In the initial stage, as shown in FIG. 7, the carrier pull-out member 36 and loading hook 40 are engaged with the carriers 20, 20 of the stocker 21. The main slider 34 is at the position just before it departs from the gear 62 which rotates in the clockwise direction as viewed down.

The turntable 70a is at the raised position. The stocker 21 is the lowermost position. The brake member 60 is at the back position as shown in FIG. 16 and the protrusion 60c engages with the inner teeth gear 52 to stop it (in this state, the switches SW2, SW4, and SW8 are on, and the switches SW5 and SW7 are off). Therefore, the second motor 50 can rotate only the carrier gear 54. The stocker lift slider 25 is therefore moved by the second motor so that the stocker 21 shown in FIGS. 2, 5, and 6 is moved up and down.

In this state, the stocker 21 is moved up and down to align the loading hook 40 with the height position of the carrier of a disk to be reproduced so that the disk to be reproduced can be selected. Specifically, the second motor raises the stocker 21, and the counter of the control circuit for storing the stocker position in accordance with on/off of the switch SW6 is counted up starting from "0" to align the height position of the carrier of the disk to be reproduced with that of the loading hook 40. The height position of the carrier 20 for exchanging disks may be aligned with that of the carrier pull-out member 36.

First, the disk exchange operation will be described. Disk exchange may be performed at the initial stage. Disk exchange can also be performed in the reproducing state that the loading hook 40 moved the carrier 20 onto the turntable 70a (in this state, the switch SW7 is on and the switch SW8 is off). Specifically, as described earlier, when the main slider 34 is at the position shown in FIG. 7, the turntable 70a is at the raised position. If the carrier 20 is moved onto the turntable 70a by the loading hook 40 before the turntable 70a rises, the disk on the carrier 20 is held by the turntable 70a and clamper 10 and is in the reproducing state.

Even if the main slider 34 moves from the position shown in FIG. 7 toward the front side (lower side in FIG. 7), the state of the brake member 60 does not change so that the gear 52 does not rotate without any change in the reproducing state.

After the second motor 50 moves the stocker lift slider 25 and moves up and down the stocker 21 to align the height position of the carrier 20, whose disk is to be exchanged, with that of the carrier pull-out member 36, the main slider 34 is moved forward by the first motor 7.

At the initial stage of the motion stroke of the main slider 34, the rotary member 35 shown in FIG. 3 rotates in the clockwise direction as viewed down, and its shaft 35a engages with the J-shaped groove 2a of the right side chassis shown in FIG. 9 at the portion perpendicular to the motion direction of the slider tray 31. Therefore, the back and forth motion of the shaft 35a of the rotary member 35 is stopped so that the slider tray 31 supporting the rotary member 35 does not move.

Similarly, the carrier pull-out member 36 does not move at the initial stage of the forward stroke of the main slider 34. At the intermediate stage of the forward stroke of the main slider 34, the rotary member 37 shown in FIG. 10 rotates by being guided by the recess 34c of the main slider 34, and the shaft 37a of the rotary member 37 enters the straight portion of the J-shaped groove 31a so that the carrier pull-out member 36 is driven forth. The front end portion of the carrier 20 is transported and placed on the tongues 32a, 32a of the lower plate 31 and supported by the slider tray 31. As the main slider 34 moves further, as shown in FIG. 11 the recess 34d of the main slider 34 engages with the shaft 35a so that the rotary member 35 rotates in the counter-clockwise direction. Then, the shaft 35a engages with the J-shaped groove 2a at the portion extending to the motion direction of the slider tray 31 so that the slider tray 31 becomes movable and the shaft 35a is pushed by the recess 34d. Therefore, the slider tray 31 moves forward, i.e., in the direction of protruding from the housing.

Specifically, the slider tray 31 moves from the position shown in FIG. 7 to the position shown in FIG. 8. At this time, the switch SW3 turns off. In the state shown in FIG. 8, the slider tray 31 protrudes from the housing and also the carrier 20 is pulled out together with the slider tray 31 by the carrier pull-out member 36. In the state shown in FIG. 8, the disk on the carrier 20 can be exchanged or a new disk can be placed on the carrier 20.

In accommodating the carrier 20 in the stocker 21, the motor 7 is rotated in the reverse direction. In this case, the shaft 35a is guided by the J-shaped groove 2a and the rotary member 35 rotates in the clockwise direction. Therefore, after the slider tray 31 is retracted (which is detected from an on-state of the switch SW4), the main slider 34 can be retracted further.

A presence/absence of a disk on the carrier 20 is detected from a signal from the light receiving element 74 which signal is generated when the slider tray 31 is retracted and the carrier 20 is accommodated in the stocker 21. Since the distance C shown in FIG. 6 is shorter than the thickness of a disk, it is possible to prevent two disks on the carrier from being moved into the housing. By repeating the operations of selecting a carrier by moving up and down the stocker and protruding the selected carrier from the housing to exchange disks, disks of all carriers can be exchanged. Next, the operation of reproducing a desired disk on the carrier, starting from the initial stage, will be described. In the initial stage shown in FIG. 7, the stocker is moved up and down to align the carrier 20, whose disk is to be reproduced, with the loading hook 40. Thereafter, the first motor 7 retracts the main slider 34 so that the teeth of the gear 62 mesh with the rack 34b and the gear 62 and cam gear 63 rotate in the counter-clockwise direction.

Then, the turntable 71a lowers from its raised position and the brake member 60 moves forth to stop the carrier gear 54. This is detected from an on-state of the switch SW5. This state is shown in FIG. 18. While the cam gear 63 rotates from the point D to point B shown in FIG. 19(f), the disk position detecting member 26 rises once and then lowers as shown in FIG. 19(d).

The inner teeth gear 52 is therefore rotated by the second motor 50 and the loading slider 9 is moved back. The carrier 20 is moved onto the turntable 70a by the loading slider 9 via the loading hook 40 (this state is detected from an on-state of the switch SW7).

Thereafter, by the rotation opposite in the direction to the preceding state of the first motor 7, the main slider 34 is moved forth (toward the position shown in FIG. 7Z) to the position just before it departs from the gear 62, and the turntable 70a rises to clamp the disk and the reproducing state starts (this state is detected from an on-state of the switch SW4). In this state, the first motor 7 is under the conditions that it moves the main slider 34 so that disks can be exchanged as described above. Namely, with this apparatus, disks can be exchanged during the reproducing state.

After the disk reproduction, the disk is moved back to the stocker 21. This operation is performed by rotating the first and second motors 7 and 50 in the directions opposite to those when a disk is mounted on the turntable. Specifically, the main slider 34 is first moved by the motor 50 from the point D to point B shown in FIG. 19 (the main slider 34 is retracted from the position shown in FIG. 7 and this state is detected from an on-state of the switch SW5). Thereafter, the second motor 50 moves forth the loading slider 9 from the reproducing position to the position shown in FIG. 14(a) to accommodate the carrier 20 in the stocker 21. This state is the initial stage shown in FIG. 7.

In the above manner, reproduction of a disk or exchange of disks in the stocker is carried out. When the slider tray 31 is moved from the outside of the housing to the inside of the housing, i.e., when the carrier 20 is moved from the outside of the hosing into the stocker 21, the main slider 34 moves to the point G shown in FIG. 19 (this is detected from an on-state of the switch SW4). By moving the main slider 34 in the above manner, the disk position detecting member 26 rises. However, if the disk position detecting member 26 is hindered to move up by a displaced disk or carrier 20, the switch SW10 is not activated. In this case, the slider tray 31 is moved to the outside of the housing. After the position displacement of the disk is corrected, the slider tray 31 is moved to the inside of the housing.

Also when the carrier 20 is moved back to the stocker 21 from the reproducing position, the disk position detecting member 26 is raised, and if there is a position displacement of a disk or carrier 20, the returned carrier is ejected to the outside of the housing. In this case, after the height position of the carrier to be ejected is aligned with that of the carrier pull-out member 36 by lowering the stocker 21 by one stage of carrier, the main slider 33 is moved to the outside of the housing.

In stopping the apparatus after disk reproduction or disk exchange, the disk position detecting member 26 is moved up and the stocker 21 is lowered to make the disk position detecting member 26 insert into holes of all the disks and carriers in the stocker. With this arrangement, even if a force is applied to a disk and carrier in the stocker while the apparatus is moved or the like, the position displacement of the carrier and disk does not occur.

Figure 22:
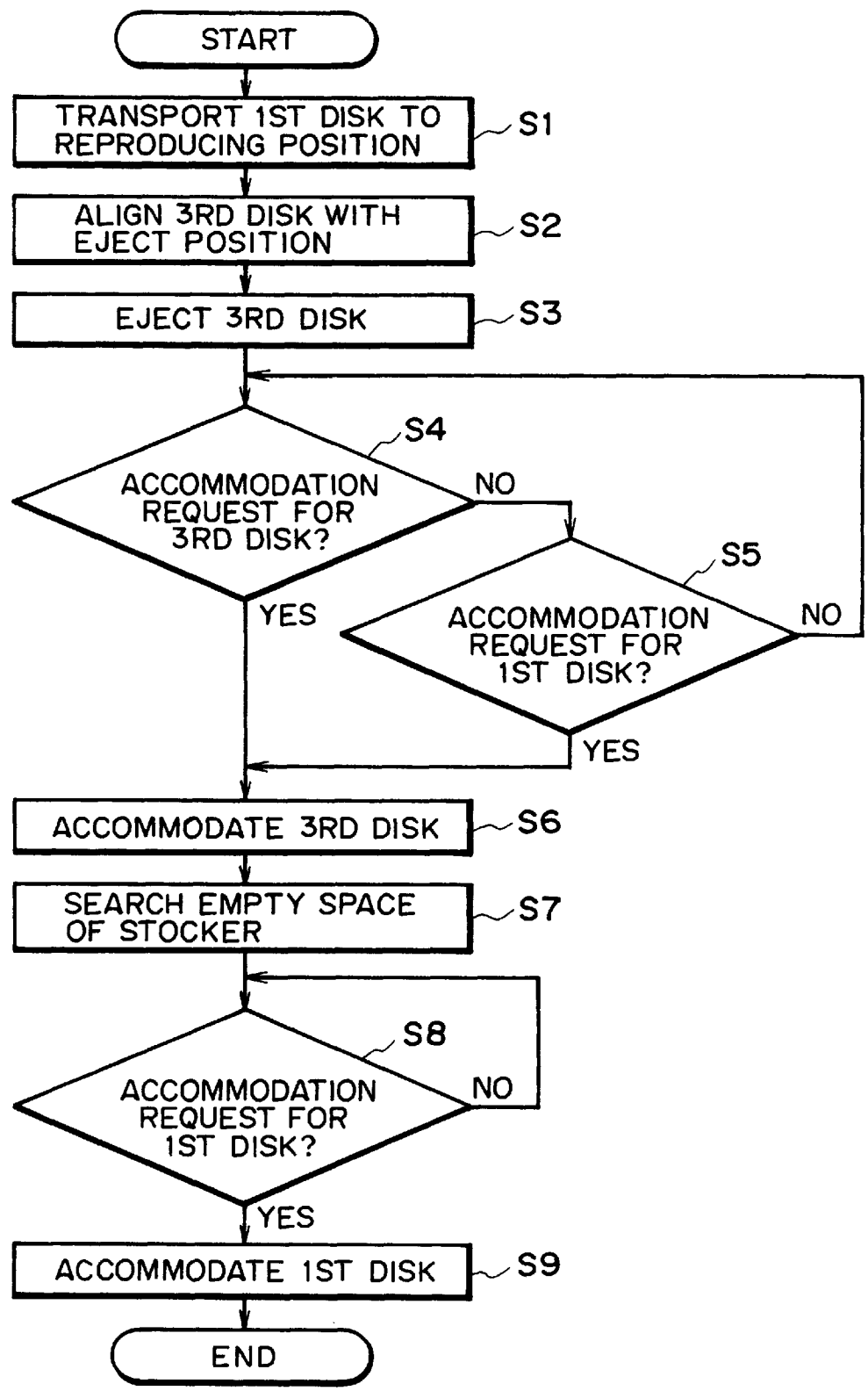
FIG. 22 is a flow chart illustrating the operation of the disk reproducing apparatus according to the embodiment of the invention.

Next, with reference with FIG. 22, a carrier accommodating method will be described for the case where the carrier is transported to the reproduction position or the outside of the housing. For convenience of description, it is assumed in the following description that not a carrier but a disk is transported to the stocker. It is also assumed that the third disk from the uppermost stage is ejected to the outside of the housing in the state that the first disk at the uppermost stage is transported to the reproducing position. First at Step S1, after the stocker 21 is moved up and down so that the first disk is at the position from which the first disk is transported to the reproducing position by the loading hook 40, the first disk is transported by the loading hook 40 to the reproducing position.

Next at Step S2, the stocker 21 is moved up and down so that the third disk is at the position from which the third disk is ejected to the outside of the housing by the slide tray 31, and thereafter at Step S3 the third disk is ejected to the outside of the housing by the slider tray 31.

Next at Step S4 it is checked whether there is an accommodation request for the third disk at the outside of the housing. If there is an accommodation request, the flow advances to Step S6, and if not, the flow advances to Step S5. At Step S5 it is checked whether there is an accommodation request for the first disk at the reproducing position. If there is an accommodation request, the flow advances to Step S6 after a flag for the accommodation request is set, and if not, the flow advances to Step S4.

At Step S6, without moving up and down the stocker 21, the third disk at the outside of the housing is accommodated in the stocker 21 by the slider tray 31. Next at Step S7 one empty space of the stocker 21 is searched to align the empty space with the height position where the first disk is returned back by the loading hook 40. In this case, after the stocker 21 is returned to the home position, the stocker 21 is raised one stage after another while checking (while searching the empty space) from the switch SW9 whether there is a carrier at the position where the disk is returned from the outside of the housing. If the empty space is found, the stocker 21 is raised by one stage to align the empty space with the height position where the first disk is returned back.

Next at Step S8 it is checked whether there is an accommodation request for the first disk at the reproducing position. If there is an accommodation request, the flow advances to Step S9, and if not, Step S8 is repeated.

At Step S9, the first disk is moved from the reproducing position into the stocker 21 by the loading hook 40. In this case, the flag for the accommodation request is reset. If a disk is transported from the stocker to the reproducing position and then another disk is transported to the outside of the housing, as in the above manner, the disk at the outside of the housing is first accommodated into the stocker and then the disk at the reproducing disk is accommodated in the stocker. Therefore, it is not necessary to search the position at which the disk at the outside of the disk is accommodated. Furthermore, since there is only one empty space of the stocker when the disk at the reproducing position is to be accommodated, the empty space can be searched by raising the stocker 21 one stage after another. It is therefore unnecessary to provide a disk pickup position storage device of a complicated structure.

If the power is turned off under the conditions that the disk is ejected out of the stocker, after the disk ejected to the outside of the housing is accommodated in the stocker, the disk at the reproducing position can be accommodated in the stocker at the searched empty space.

It is also not necessary to provide means for storing the disk pull-out position of the stocker. It is also possible to use the same drive source for the first and second transport means and position determining means, so that the manufacture cost can be reduced considerably.

Different from the above embodiment, a disk may be transported first from the stocker to the outside of the housing, and then another disk is transported to the reproducing position. In this case, after the disk at the outside of the housing is moved back first and then the disk is transported to the reproducing position. It is therefore unnecessary to search the empty space for accommodating the disk at the outside of the housing.

In the embodiment, for example, as the main slider 34 moves back, the power of the second motor 50 is transmitted to the second transport means (loading means), and as the main slider 34 moves forth, the transmission destination of the power of the second motor 50 is switched. This switching order may be reversed obviously. In this case, in the state that the main slider moves forth to the position slightly before the position where the first transport means is driven, the stocker moving means is made to become capable of being driven. Since the stocker is movable in the state that the disk is accommodated in the stocker by the main slider (the main slider is at the position where the first transport means can be driven), it is possible to exchange disks during the reproducing state.

Figure 23:
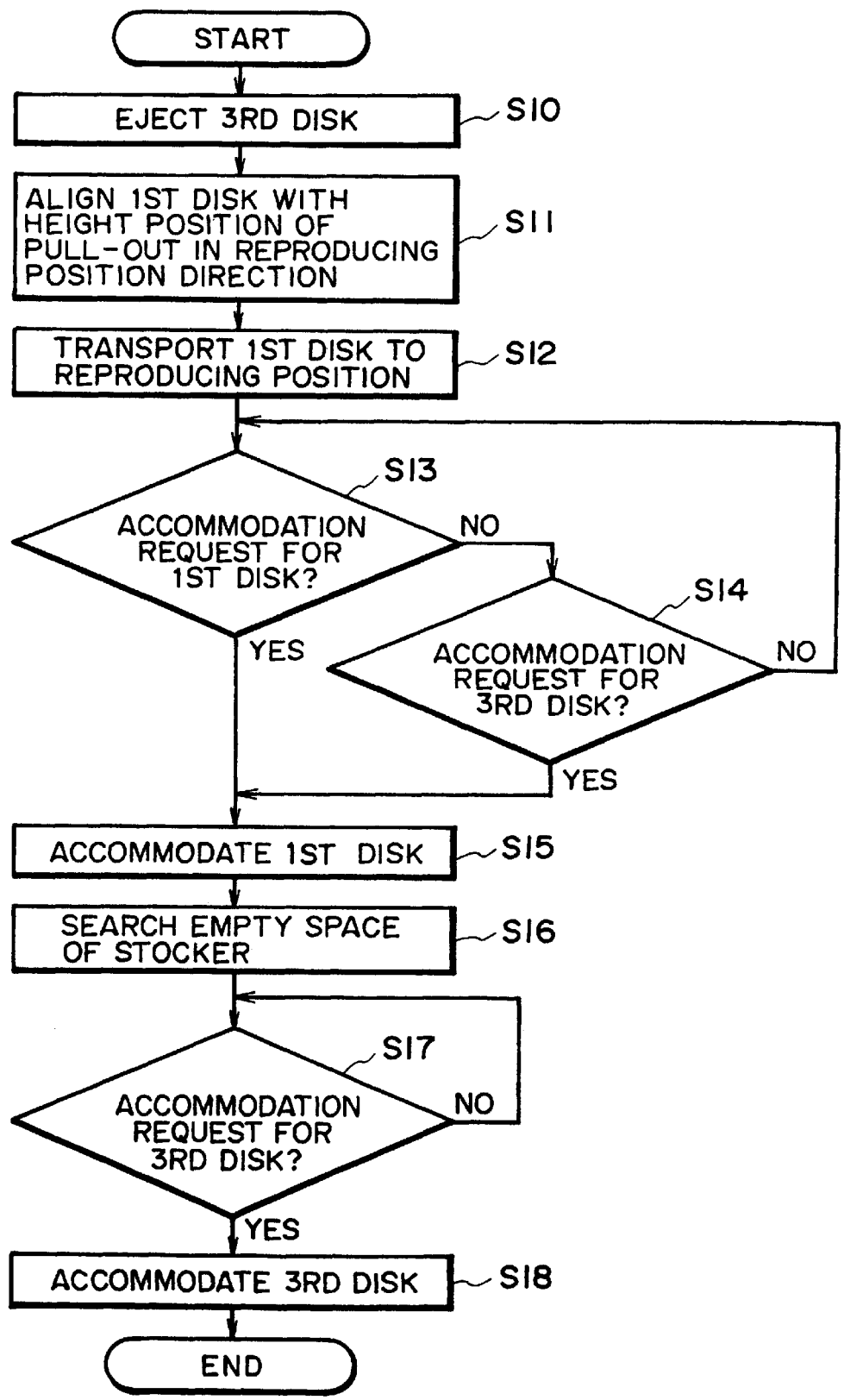
FIG. 23 is a flow chart illustrating the operation of a disk reproducing apparatus according to another embodiment of the invention.

An example of this operation will be described with reference to FIG. 23, assuming that the first disk at the uppermost stage is transported to the reproducing position in the state that the third disk from the uppermost stage in the stocker 21 is ejected to the outside of the housing. First, after the stocker 21 is moved up and down to align the first disk with the position from which the first disk is ejected to the outside of the housing by the slider tray 31, at Step S10 the third disk is ejected by the slider tray 31 to the outside of the housing.

Next at Step S11, the stocker 21 is moved up and down to align the first disk with the position from which the first disk is transported to the reproducing position by the loading hook 40, and thereafter the first disk is transported by the loading hook 40 to the reproducing position.

Next at Step S13 it is checked whether there is an accommodation request for the first disk at the reproducing position. If there is an accommodation request, the flow advances to Step S15, and if not, the flow advances to Step SW14. At Step S14 it is checked whether there is an accommodation request for the third disk at the outside of the housing. If there is an accommodation request, the flow advances to Step S15 after a flag for the accommodation request is set, and if not, the flow advances to Step S13.

At Step S13, without moving up and down the stocker 21, the first disk at the reproducing position is accommodated in the stocker 21 by the loading hook 40. Next at Step S16 one empty space of the stocker 21 is searched to align the empty space with the height position where the third disk is returned back by the slider tray 31. In this case, after the stocker 21 is returned to the home position, the stocker 21 is raised one stage after another while checking (while searching the empty space) from the switch SW9 whether there is a carrier at the position where the disk is returned from the outside of the housing. If the empty space is found, the stocker 21 is stopped to align the empty space with the height position from which the third disk at the outside of the housing is returned back.

Next at Step S17 it is checked whether there is an accommodation request for the third disk at the outside of the housing. If there is an accommodation request, the flow advances to Step S18, and if not, Step S17 is repeated.

At Step S18 the third disk is moved from the outside of the housing into the stocker 21 by the slider tray 31. In this case, the flag for the accommodation request is reset. If a disk is transported from the stocker to the outside of the housing and then another disk is transported to the reproducing position, as in the above manner, the disk at the reproducing position is first accommodated into the stocker and then the disk at the outside of the housing is accommodated in the stocker.

With a disk reproducing apparatus having a stocker for accommodating a plurality of disk constructed as above, it become possible to exchange disk even during the reproducing state of a disk. The transport means which pulled the disk out of the stocker later is driven first to return the disk back to the stocker. Therefore, it is not necessary during this period to drive the positioning means, eliminating wasteful operations.

Next, with reference to FIGS. 24 to 28, the initializing operation upon turning on a power will be described. This initializing operation takes into consideration various cases when the power is turned off, so as to deal with an abrupt power failure or the like. With this apparatus, however, the stocker 21 is not moved while the slider tray 34 protrudes to the outside of the housing. Therefore, if the slider tray 34 protrudes to the outside of the housing when the power is turned off, the position for accommodating the carrier 20 above the slider tray is the same as that to which the carrier is returned back by the slider tray at the stop position of the stocker 21 at that time.

Figure 24B:
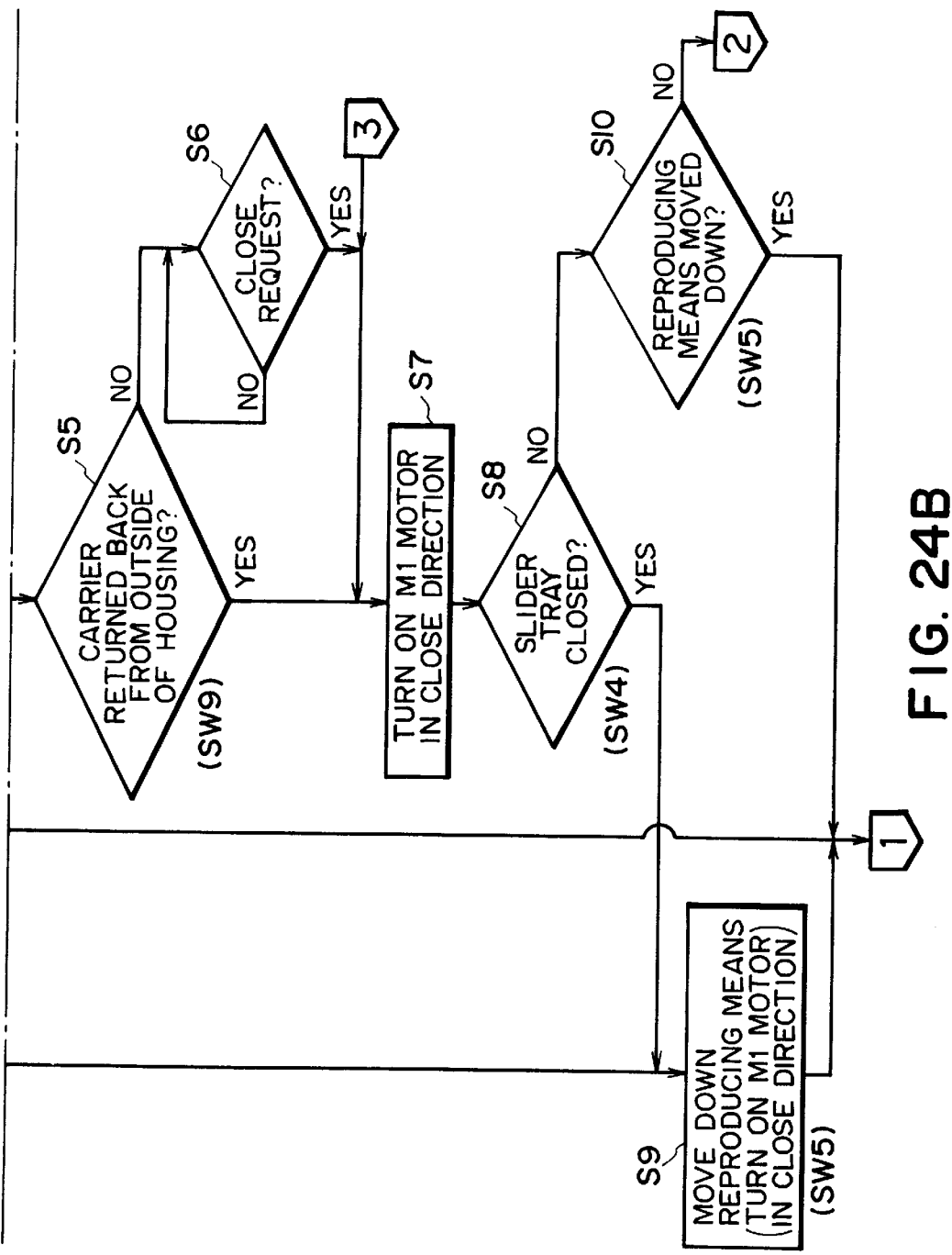
FIG. 24(a,b) is a flow chart illustrating the operation of a disk reproducing apparatus according to another embodiment of the invention.
Figure 25A:
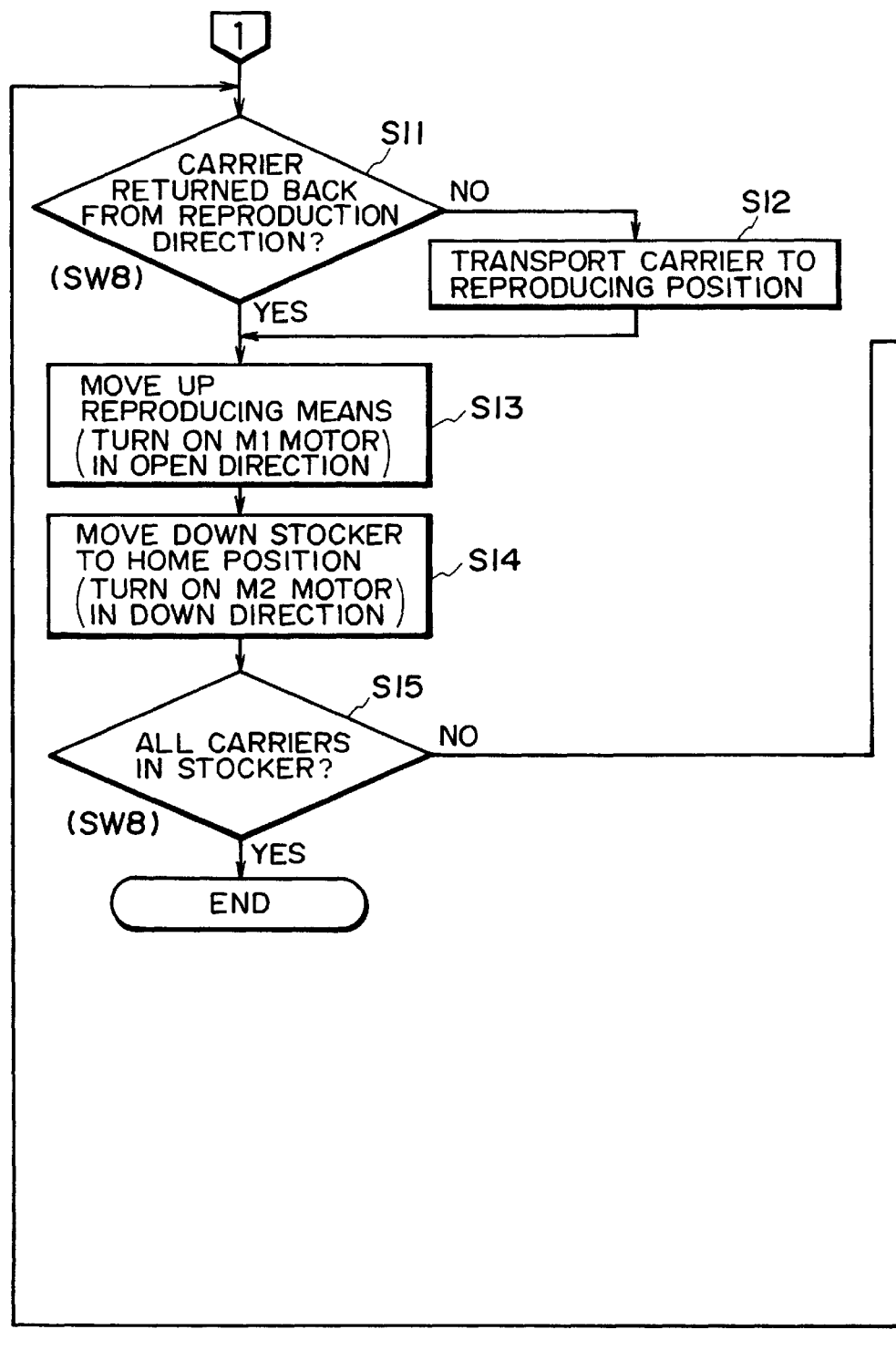
FIG. 25(a,b,c) is a low chart illustrating the operation of a disk reproducing apparatus according to another embodiment of the invention.
Figure 25:
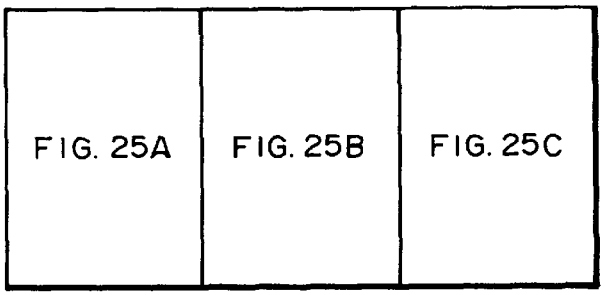
Figure 25B:
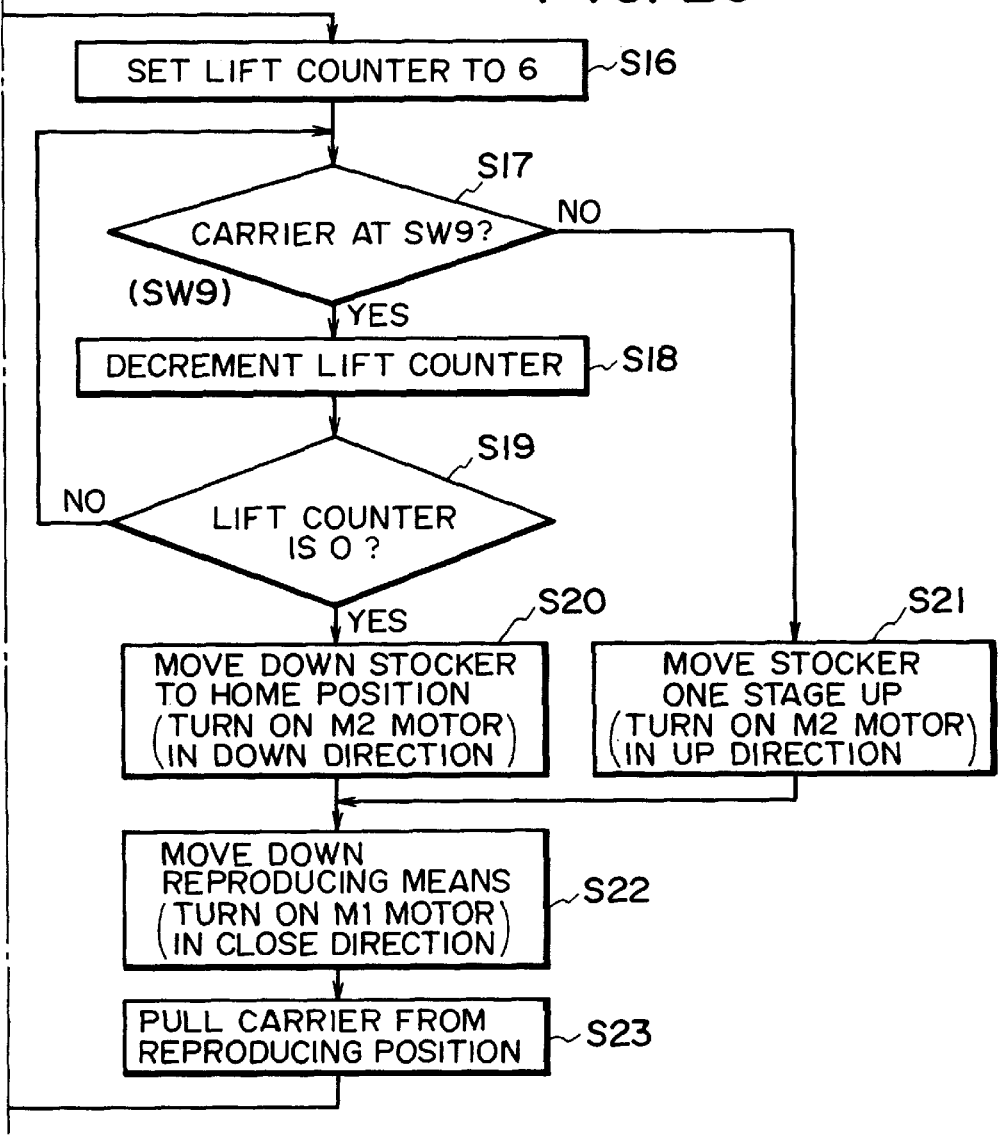
Figure 25C:
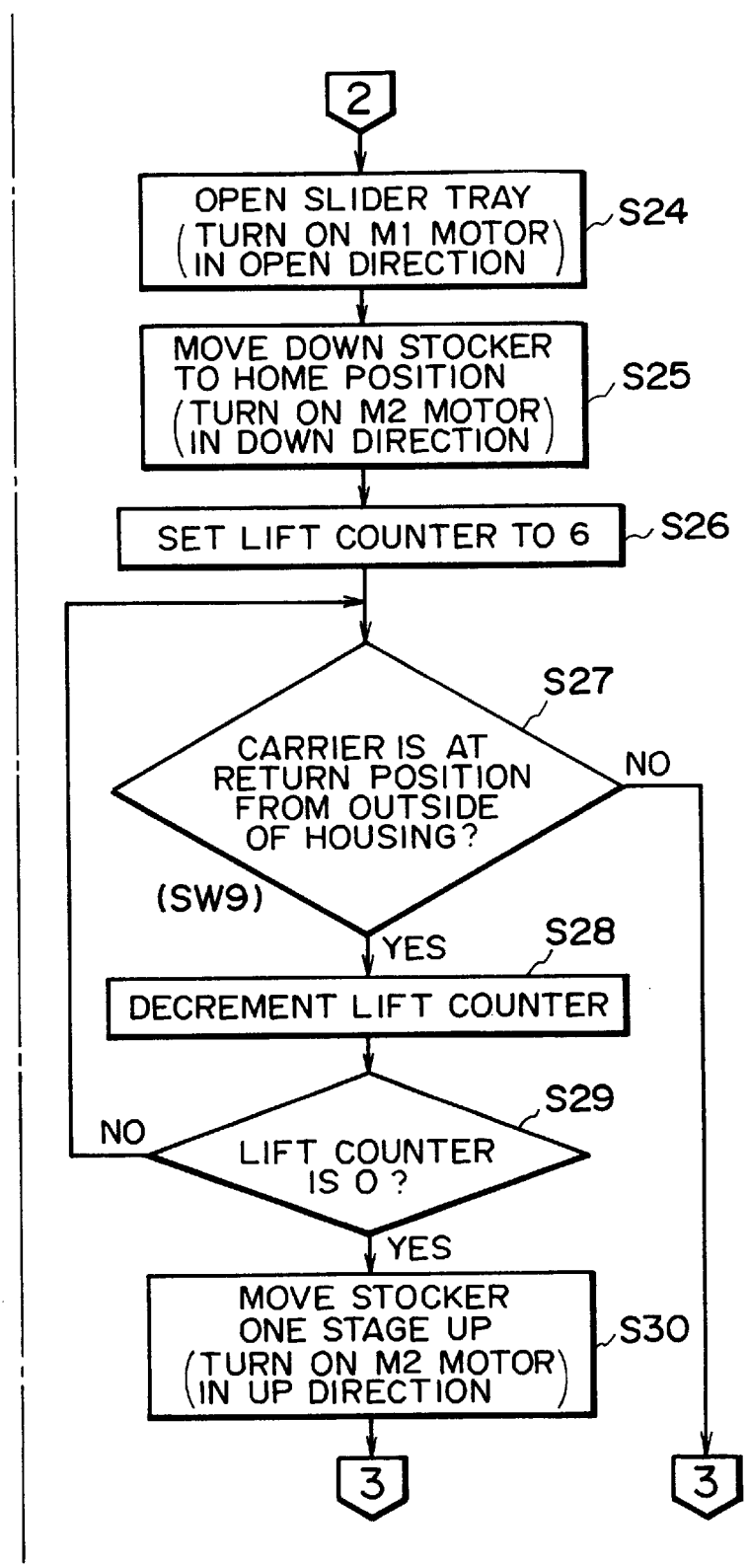
Figure 26:
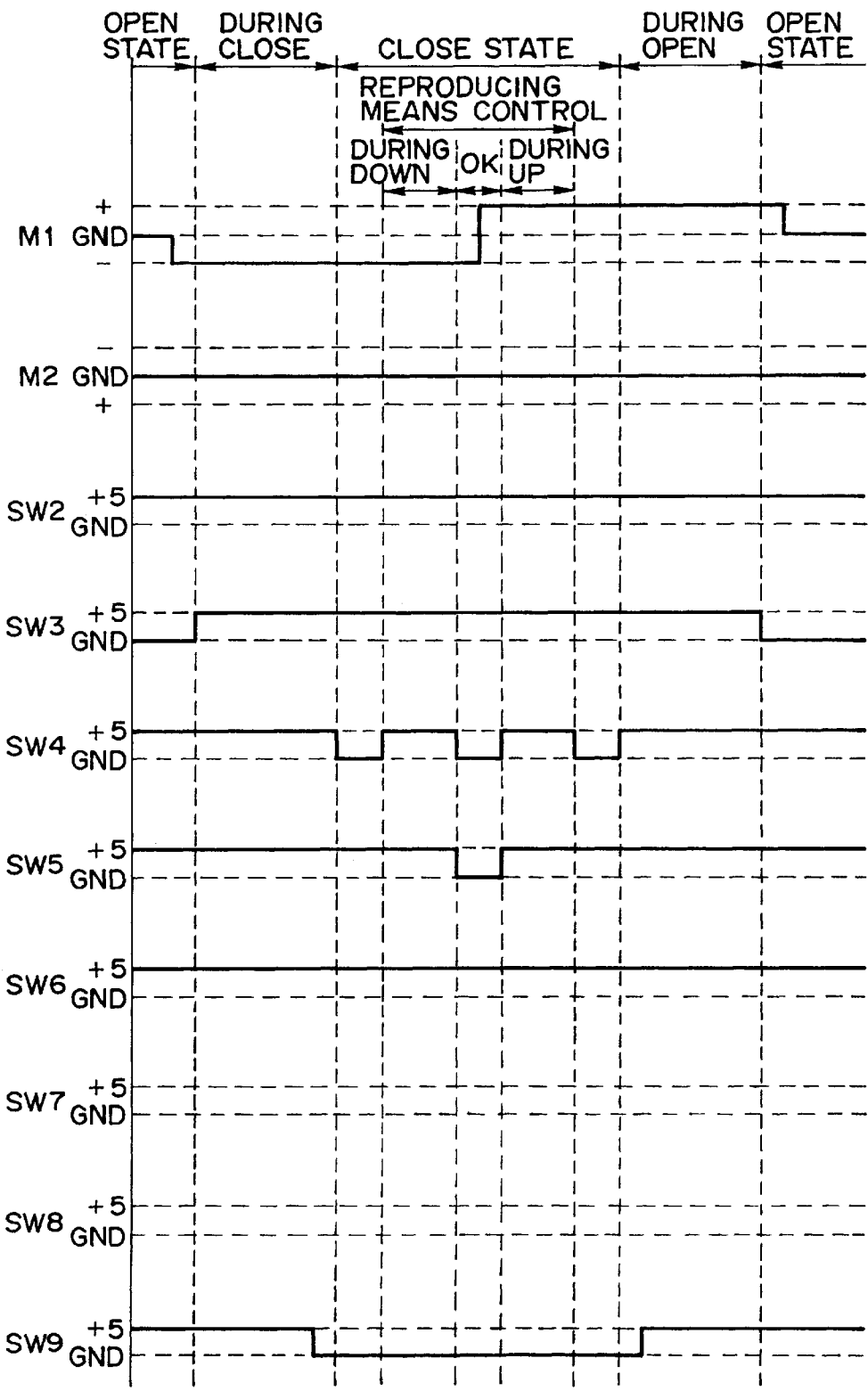
FIG. 26 is a low chart illustrating the operation of a disk reproducing apparatus according to another embodiment of the invention.
Figure 27:
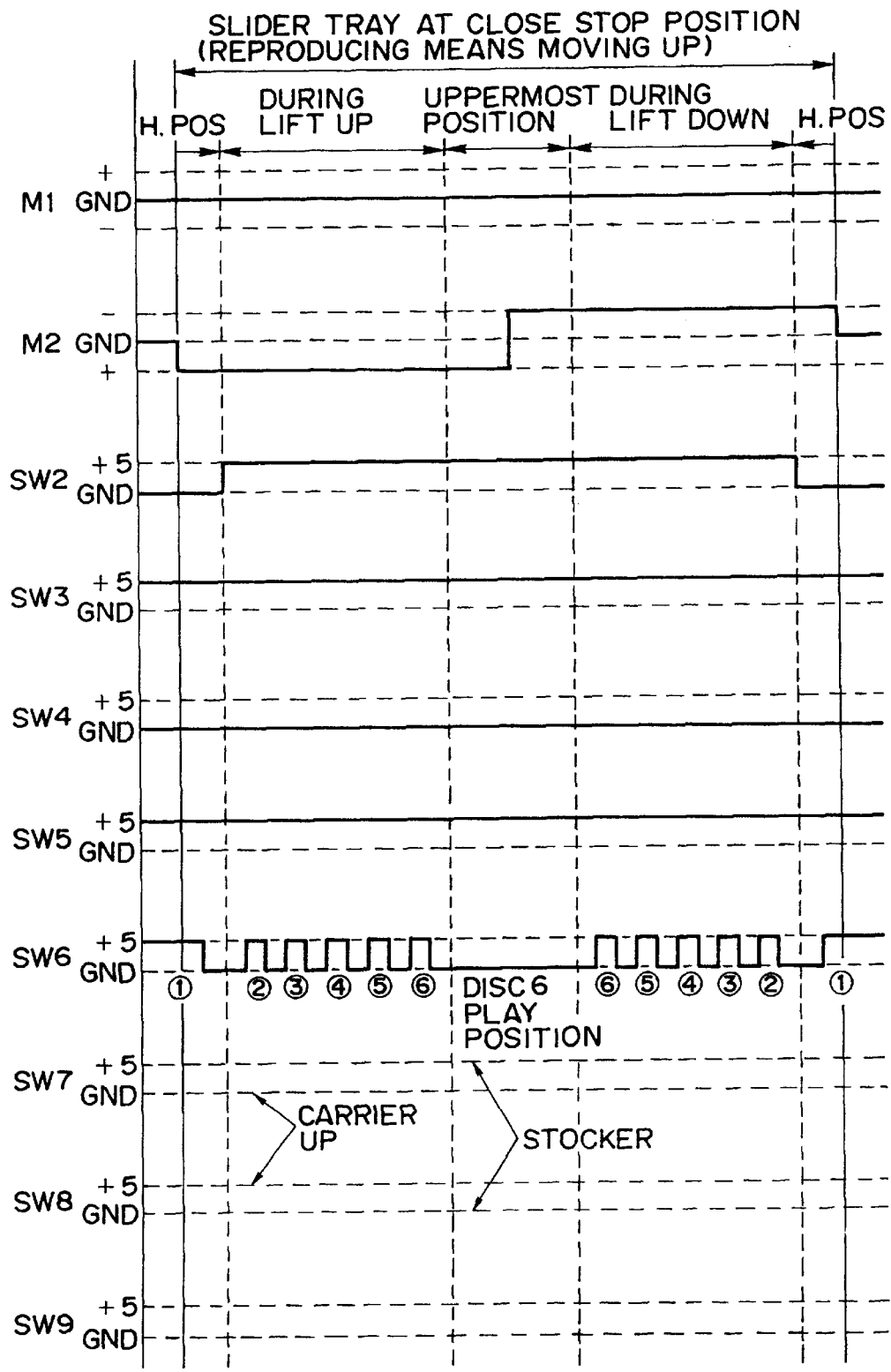
FIG. 27 is a low chart illustrating the operation of a disk reproducing apparatus according to another embodiment of the invention.
Figure 28:
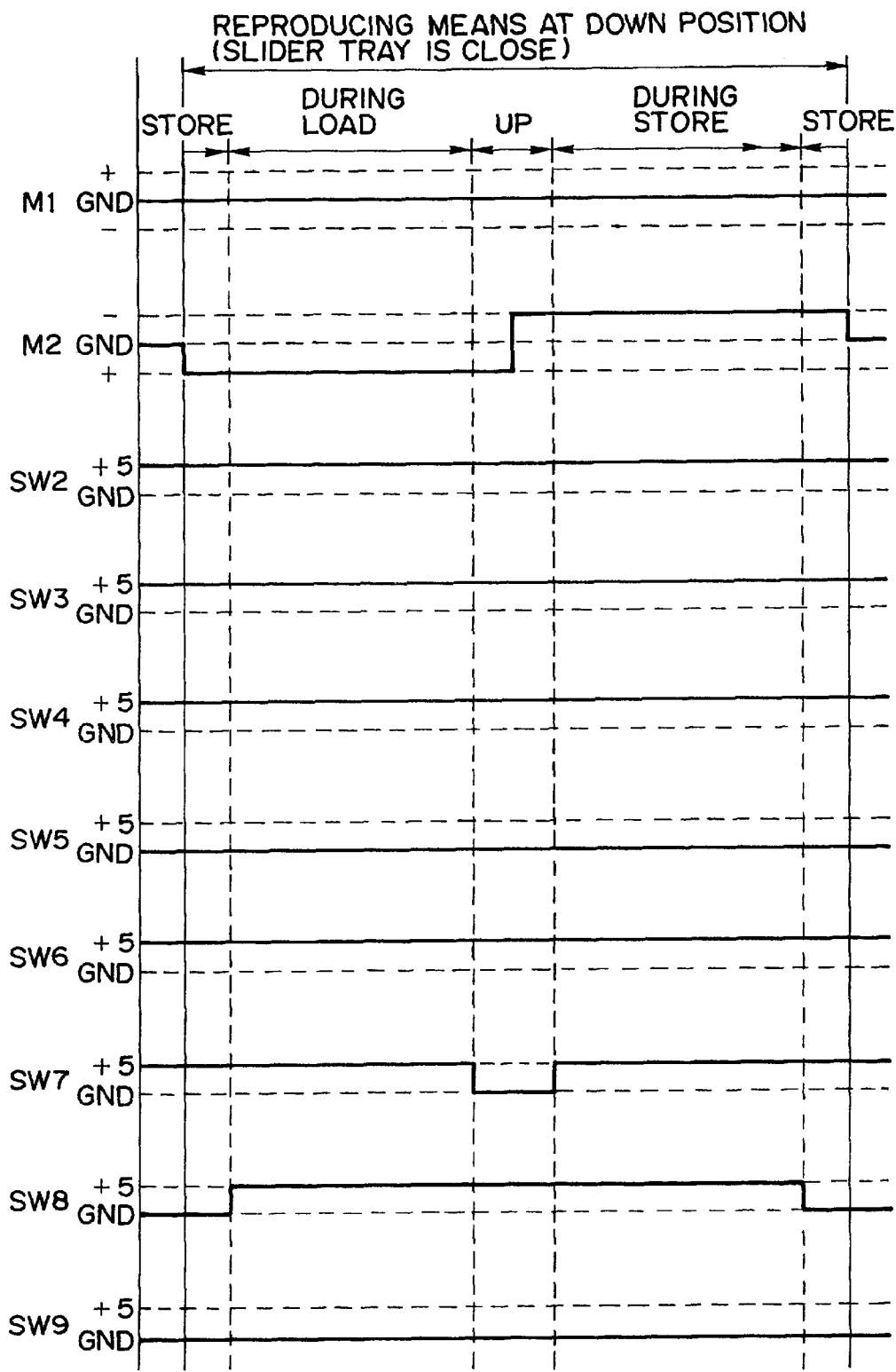
FIG. 28 is a low chart illustrating the operation of a disk reproducing apparatus according to another embodiment of the invention.
Figure 29:
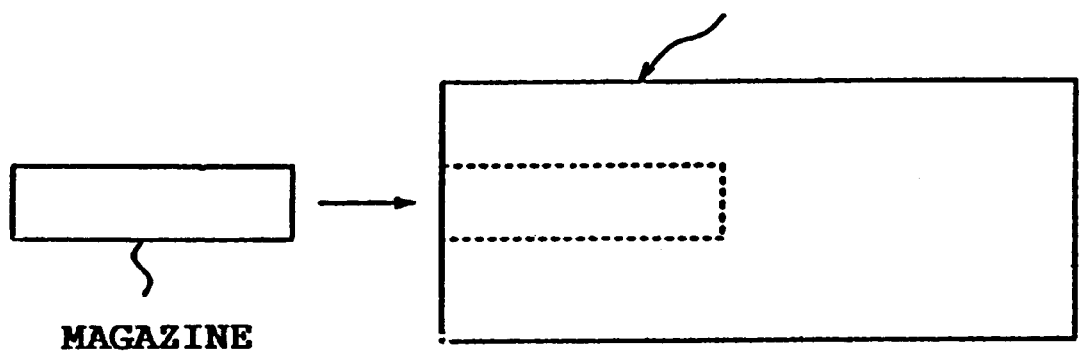
Figure 30:
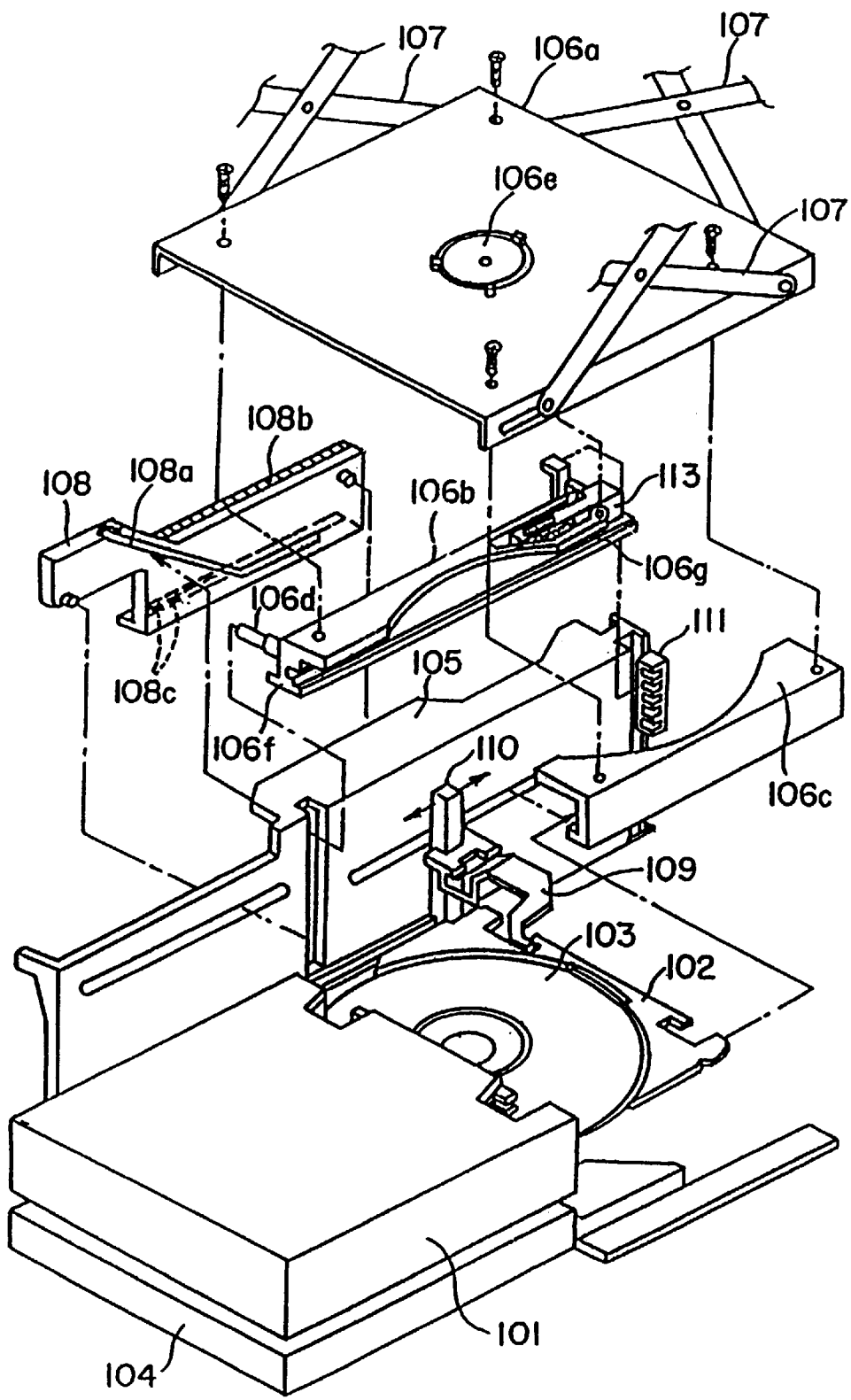
Figure 31:
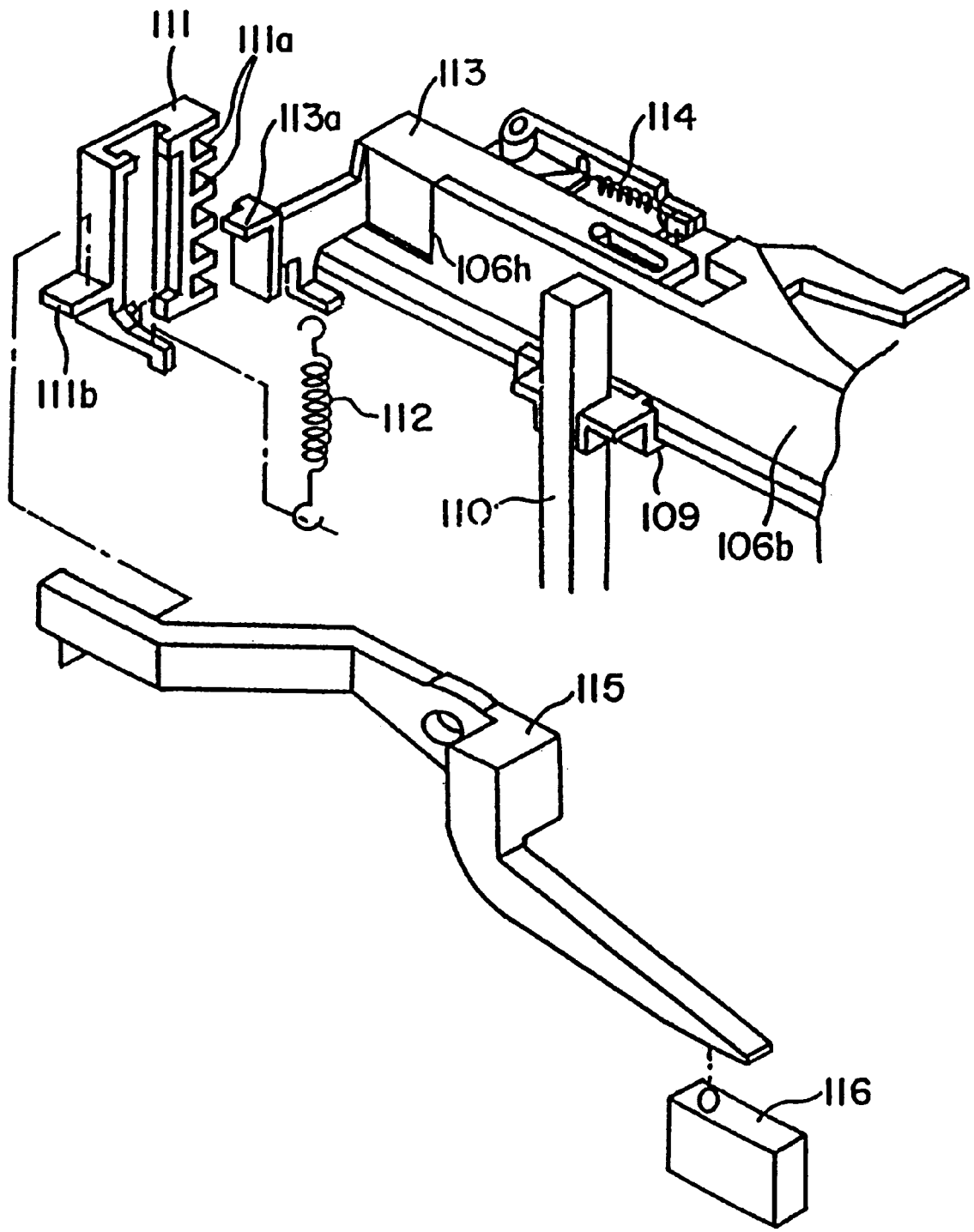

FIGS. 24 and 25 are flow charts illustrating the initializing routine. FIGS. 26 to 28 are timing charts illustrating the operation of each motor and the input and output of each switch when each motor rotates in the normal direction and then in the reverse direction. Reference characters M1 and M2 represent the first and second motors 7 and 50, and reference symbols SW2 to SW9 represent the switches SW2 to SW9, respectively. The outputs of SW2 to SW9 not shown by a solid line mean that the outputs are not determined only by that state.

With reference to FIGS. 24 and 25, the initializing routine will be described. As the power is turned on, first at Steps S1 and S2 the pickup feed motor is driven to initialize the pickup. With this operation, the pickup is fed to the home position.

Next at Step S3 it is checked whether the switch SW4 is on (the output is at a ground level, the same expression will be used in the following, and an off-state is +5 V), the switch SW4 detecting whether the slider tray 31 is close or not. If on, the main slider 34 is at the position (home position) where the main slider 34 makes the slider tray 31 return back to the inside of the housing and the flow advances to Step S9, and if not on, the flow advances to Step S4.

At Step S4, it is checked whether the switch SW5 for detecting a down-state of the turntable is on or not. If on, the main slider 34 is at the most back position and the flow advances to Step S11, and if not on, the flow advances to Step S5. At Step S5 it is checked whether the switch SW9 is on, the switch SW9 detecting a presence/absence of a carrier 20 at the position from which the carrier 20 in the stocker 21 is pulled out of the housing. If on, it is judged that the main slider 34 is at the intermediate position between the home position and the most back position. In this case, the flow advances to Step S7. If not on, it is judged that the main slider 34 is at the intermediate position between the home position and the most front position. In this case, the flow advances to Step S6.

At Step S6, it is checked whether a tray close key among the operation keys is depressed, and if depressed, the flow advances to Step S7. In this embodiment, at Step S6 an operator depresses the tray close key if the slider tray is open at the time of power-on. In this case, it is obvious that the slider tray may be automatically closed instead of depressing the tray close key by the operator.

At Step S7, the first motor is driven for a predetermined period in the slider tray close direction, or the first motor is driven in the slider tray close direction until the switch SW4 turns on, to thereafter advance to Step S8. At Step S8, it is checked whether the switch SW4 is on. If on, the slider tray 31 is in the housing so that Step S9 and following Steps are executed, whereas if not on, the flow advances to Step S10.

At Step S9, the first motor is driven in the tray close direction until the switch SW5 turns on, i.e., until the main slider 34 comes to the most back position, and the flow advances to Step S11. At Step S11 and following Steps the process is performed for the case wherein the main slider 34 is at the most back position.

First at Step S11 it is checked whether the switch SW8 is on, the switch SW8 detecting that the carrier is returned back from the reproducing position to the stocker. If on, the loading slider 9 is at the position where the carrier is returned back to the stocker. In this case, the flow advances to Step S13. If not on, at Step S12 the second motor is driven in the carrier feed direction to the reproducing position until the switch SW7 turns on, and the flow advances to Step S13.

At Step S13 the first motor is driven until the turntable moves up and the switch SW4 turns on, and the flow advances to Step S14. At Step S14 the second motor is driven until the stocker reaches the home position (lowermost position) and the switch SW2 turns on, and the flow advances to Step S15. At Step S15 it is checked whether the switch SW8 is on, the switch SW8 detecting that the loading slider 9 is at the position where it accommodates the carrier in the stocker. If on, the stocker is at the lowermost position in the state that all the carriers are accommodated in the stocker, and the initializing routine is terminated.

If the switch SW8 is not on at Step S15, it means that the slider tray 31 is in the housing and that the loading slider 9 is not at the position where it accommodates the carrier in the stocker. At Steps S16 to S23 the empty space of the stocker is searched and the loading slider 9 operates to accommodate the carrier 20 in the empty space.

First at Step S16 a lift counter for storing the stocker position is set to "6". Next at Step S17 it is checked whether the switch SW9 is on, the switch SW9 detecting a carrier at the position from which the carrier 20 in the stocker 21 is moved to the outside of the housing. If on, it is judged that the carrier is at the position from which the carrier 20 is moved to the outside of the housing. The flow then advances to Step S18. If not on, there is no carrier at the position from which the carrier 20 is moved to the outside of the housing.

In this case, as described earlier, the loading slider 9 moves the carrier into and from the shelf one stage higher than the position from which carrier 20 is moved to the outside of the housing. Therefore, at Step S21 the second motor operates to move up the stocker by one stage to align the empty place with the height position of the shelf in which the carrier is accommodated, by using the loading slider 9. Thereafter, the flow advances to Step S22.

At Step S18 the stocker is raised by one stage until the switch SW6 turns on and off once and the lift counter is decremented, to thereafter advance to Step S19. At Step S19 it is checked whether the lift counter is "0". If not 0, Step S17 and following Steps are repeated. If the lift counter is 0 at Step S19, it means that carriers are accommodated in all shelves of the stocker and the loading slider 9 is not at the carrier accommodating position.

Specifically, in this case, the loading hook 40 is detached from the carrier so that Step S20 and following Steps are executed. At Step S20 the stocker is lowered to the home position to align the upper space of the uppermost carrier with the height position of the loading hook 40, and the flow advances to Step S22.

At Step S22, the first motor operates to lower the turntable until the switch SW5 turns on, and the flow advances to Step S23. At Step S23, the second motor operates to drive the loading slider 9 in the carrier accommodating direction until the switch SW8 turns on. At this stage, all carriers are being accommodated in the stocker and the loading hook 40 is in the stocker. Therefore, at Step S11 and following Steps, the stocker is lowered to the home position to terminate the initializing routine. At this time, it is judged at Steps S11 and S15 to be affirmative Y.

At Step S10 it is checked whether the switch SW5 is on, the switch SW5 detecting a down-state of the turntable. If on, as shown in FIG. 26 the main slider 34 is at the most back position and the slider tray 31 is in the housing so that Step S11 and following Steps are executed.

If the switch SW5 is not on, the main slider 34 is not at the most back position although the firs motor is driven in the tray close direction at Step S9 further from the slider tray close state (refer to FIG. 26). In this case, either the carrier pull-out member 36 detached from the carrier collides with the carrier or another carrier is at the position to which the carrier is returned back from the outside of the housing because the stocker is moved through malfunction while the carrier is pulled out of the housing. In such a case, the carrier pull-out member 36 cannot be retracted because it is hindered by the carrier. Namely, the main slider 34 cannot be retracted to the home position. In this case, Step S24 and following Steps are executed. In a normal operation, the stocker 21 will not be moved in the state that the carrier is pulled out of the stocker 21 by the carrier pull-out member 36.

At Step S24, the first motor operates to move the slider tray 34 in the open direction until the switch SW3 turns on, and the flow advances to Step S25. At Step S25 the second motor operates to lower the stocker until the switch SW2 turns on (to the stocker home position), and the flow advances to Step S26.

At Step S26 the lift counter is set to "6" to advance to Step S27. At Step S27 it is checked whether the switch SW9 is on, the switch SW9 detecting that the carrier is returned back from the outside of the housing. If on, the carrier is at the position to which it is returned back from the outside of the carrier. The flow thereafter advances to Step S28. If not on, there is no carrier at the position to which it is returned back from the housing, and Step S7 and following Steps are executed to return the carrier back to this position. In this case, it is judged at Step S8 to be affirmative Y and Step S9 and following Steps are executed to thereafter terminate the initializing routine.

At Step S28 the lift counter is decremented and the stocker is raised by one stage until the switch SW6 turns on and off once, and the flow advances to Step S29. At Step S29 it is checked whether the lift counter is "0". If not 0, Step S27 and following Steps are executed, whereas if 0, carriers are accommodated in all stages of the stocker, the main slider 34 cannot be retracted to the home position, and the carrier pull-out member 36 is detached from the carrier.

In this case, at Step S30 the stocker is raised further by one stage to align the space under the lowermost carrier described previously with the height position of the carrier pull-out member 36, and thereafter Step S7 and following Steps are executed. In this case, it is judged at Step S8 to be affirmative Y and Step S9 and following Steps are executed to thereafter terminate the initializing routine.

The initializing operation will be described by classifying the states at the time of power turn-on. The states not changing after the power is turned off during the normal operation include (1) a state that all carriers are accommodated in the stocker, the carrier pull-out member 36 and loading hook 40 engage with carriers, and the turntable is at a raised position, (2) a state that all carriers are accommodated in the stocker, the carrier pull-out member 36 and loading hook 40 engage with carriers, and the turntable is at a lowered position, (3) the carrier pull-out member 36 and loading hook 40 engage with carriers, and only the carrier pull-out member 36 pulls a carrier out of the stocker, (4) the carrier pull-out member 36 and loading hook 40 engage with carriers, and only the loading hook 40 pulls a carrier out of the stocker, (5) the carrier pull-out member 36 and loading hook 40 engage with carriers, only the loading hook 40 pulls a carrier out of the stocker, and the turntable is at a lowered position, and (6) the carrier pull-out member 36 and loading hook 40 engage with carriers, both the carrier pull-out member 36 and loading hook 40 pull carriers out of the stocker.

The states generated under an abnormal state because of malfunction or during the manufacture process include (7) a state that a first carrier is pulled out of the stocker by the carrier pull-out member 36, another carrier moved from the stage different from the stage from which the first carrier was pulled out of the stocker, is at the carrier return position of the carrier pull-out member 36 after the stocker is moved, and the loading hook 40 does not pull a carrier, (8) a state that a first carrier is pulled out of the stocker by the carrier pull-out member 36, another carrier moved from the stage different from the stage from which the first carrier was pulled out of the stocker, is at the carrier return position of the carrier pull-out member 36 after the stocker is moved, and the loading hook 40 pulls a carrier, (9) a state that only the carrier pull-out member 36 is detached from a carrier, (10) a state that only the loading hook 40 is detached from a carrier, and the turntable is at a raised position, (11) a state that only the loading hook 40 is detached from a carrier, and the turntable is at a lowered position, and (12) both the loading hook 40 and carrier pull-out member 36 are detached from carriers. If a carrier is pulled out of the stocker by the carrier pull-out member 36 and there is no carrier at the carrier return position of the carrier pull-out member 36 after the stocker is moved, this state is processed as the normal state (6).

For the state (1), the initializing state is terminated after Steps S1, S2, S3, S9, S11, S13, S14, and S15. For the state (2), the initializing state is terminated after Steps S1, S2, S3, S4, S11, S13, S14, and S15. For the state (3), the initializing state is terminated after Steps S1, S2, S3, S4, S5, S6, S7, S8, S9, S11, S13, S14, and S15.

For the state (4), the initializing state is terminated after Steps S1, S2, S3, S9, S11, S12, S14, S15, S16, S17, (S18, S19), S21, S22, S23, S11, S13, S14, and S15.

For the state (5), the initializing state is terminated after Steps S1, S2, S3, S4, S11, S12, S13, S14, S15, S16, S17, (S18, S19), S21, S22, S23, S11, S13, S14, and S15.

For the state (6), the initializing state is terminated after Steps S1, S2, S3, S4, S5, S6, S7, S8, S9, S11, S12, S13, S14, S15, S16, S17, (S18, S19), S21, S22, S23, S11, S13, S14, and S15.

For the state (7), the initializing state is terminated after Steps S1, S2, S3, S4, S5, S6, S7, S8, S10, S24, S25, S26, S27, (S28, S29), S7, S8, S11, S13, S14, and S15.

For the state (8), the initializing state is terminated after Steps S1, S2, S3, S4, S5, S6, S7, S8, S10, S24, S25, S26, S27, (S28, S29), S7, S8, S9, S11, S12, S13, S14, S15, S16, S17, S18, S19, S21, S22, S23, S11, S13, S14, and S15.

For the state (9), the initializing state is terminated after Steps S1, S2, S3, S4, S5, S6, S7, S8, S10, S24, S25, S26, S27, S28, S29, S30, S7, S8, S9, S11, S13, S14, and S15.

For the state (10), the initializing state is terminated after Steps S1, S2, S3, S9, S11, S13, S14, S15, S16, S17, S18, S19, S20, S22, S23, S11, S13, S14, and S15.

For the state (11), the initializing state is terminated after Steps S1, S2, S3, S4, S11, S12, S13, S14, S15, S16, S17, S18, S19, S20, S22, S23, S11, S13, S14, and S15.

For the state (12), the initializing state is terminated after Steps S1, S2, S3, S4, S5, S6, S7, S8, S10, S24, S25, S26, S27, S28, S29, S30, S7, S8, S9, S11, S12, S13, S14, S15, S16, S17, S18, S19, S20, S22, S23, S11, S13, S14, and S15.

In the above description, if one of the carrier pull-out member 36 and loading hook 40 is detached from a carrier, the other of the carrier pull-out member 36 and loading hook 40 accommodates a carrier in the stocker. It is obvious that the initializing routine can be performed even if the carrier is pulled out.

As above, according to the embodiment, even for the states not changing after the power is turned off in the normal state and even for the abnormal states because of malfunction or the like, the initializing routine can be performed. Particularly, even if the carrier pull-out member 36 or loading hook 40 is detached from a carrier, the initializing routine allows it to be engaged with the carrier so that this routine may be used during the manufacture process to facilitate the manufacture.

What is claimed is:

1. Disk reproducing apparatus provided with a disk exchanger comprising: a stocker for accommodating a plurality of disks at respective ones of a predetermined number of shelves stacked therein; reproducing means for reproducing a disk; transport means including first transport means for, at a first transport position level, transporting a disk between said stocker and the outside of an apparatus housing and second transport means for, at a second transport position level, transporting a disk between said stocker and a reproducing position of said reproducing means; position aligning means for moving said stocker to align one shelf of said stocker, at which a disk to be transported is accommodated, with either one of the first and second transport position levels; and control means, wherein upon an instruction of transporting a first disk, said control means controls said transport means to accommodate into said stocker a second disk which has been last transported to the outside of said stocker, and then controls said position aligning means to move said stocker so that a shelf of said stocker for the first disk is aligned with either one of the first and second transport levels for transporting the first disk.

2. Disk reproducing apparatus according to claim 1, wherein said instruction is an instruction of accommodating the first disk at the outside of the apparatus housing under the conditions that the second disk has been last transported to the reproducing position, and said control means controls the second transport means to accommodate the second disk into said stocker and then controls said position aligning means to move said stocker so that a shelf of said stocker at which the first disk is to be accommodated is aligned with the first transport level for transporting the first disk.

3. Disk reproducing apparatus according to claim 1, wherein carriers are disposed at respective ones of the predetermined number of shelves of said stocker and the disk on the carrier is transported with the carrier, further comprising judging means for detecting an idle shelf at which the carrier has been transported to the outside of said stocker, said control means controls said position alignment means after accommodating the second disk to move said stocker so that the idle shelf is aligned with either one of the first and second transport level for transporting the first disk.

4. Disk reproducing apparatus according to claim 1, wherein said instruction is an instruction of transporting the first disk to the reproducing position under the conditions that the second disk has been last transported to the outside of the apparatus housing, and said control means controls the first transport means to accommodate the second disk into said stocker and then controls said position aligning means to move said stocker so that a shelf of said stocker at which the first disk is accommodated is aligned with the second transport level for transporting the first disk.

5. Disk reproducing apparatus provided with a disk exchanger comprising: a stocker for accommodating a plurality of disks at respective ones of a predetermined number of shelves stacked therein; reproducing means for reproducing a disk; transport means including first transport means for, at a first transport position level, transporting a disk between said stocker and the outside of an apparatus housing and second transport means for, at a second transport position level, transporting a disk between said stocker and a reproducing position of said reproducing means; position aligning means for moving said stocker to align one shelf of said stocker, at which a disk to be transported is accommodated, with either one of the first and second transport position levels; and control means, wherein said control means inhibits said position aligning means to move said stocker while a disk is being placed at the outside of the apparatus housing, and wherein upon a power turn-on instruction while said transport means transports a first disk to the outside of the apparatus housing and transports a second disk to the reproducing position, said control means controls said transport means to accommodate the first disk into said stocker and thereafter the second disk into said stocker.

6. Disk reproducing apparatus according to claim 5, ftrther comprising judging means for detecting an idle shelf in said stocker, wherein after accommodating the first disk into said stocker, said control means controls said position aligning means to align the idle shelf detected by the judging means with the second transport position level.

7. Disk reproducing apparatus comprising: a stocker for accommodating a plurality of carriers each of which carries a disk thereon; reproducing means for reproducing a disk; transport means for transporting a disk between said stocker and the outside of an apparatus housing and said reproducing means; an engaging unit provided at said transport means for engaging with said carrier; position aligning means for aligning relative positions of said stocker and said transport means; and control means, wherein said control means inhibits said position aligning means to move said stocker while a disk is being placed at the outside of the apparatus housing, and wherein upon a power turn-on while said engaging unit does not engage with said carrier, said control means controls said transport means to move said engaging unit to a position other than said stocker, controls said position aligning means to make said engaging unit and said stocker be at displaced positions, and thereafter controls said transport means to move said engaging unit to a position corresponding to said stocker.

8. A method of transporting a disk in disk reproducing apparatus provided with a disk exchanger, which comprises a stocker for accommodating a plurality of disks at respective ones of a predetermined number of shelves stacked therein; reproducing means for reproducing a disk; transport means including first transport means for, at a first transport position level, transporting a disk between said stocker and the outside of an apparatus housing and second transport means for, at a second transport position level, transporting a disk between said stocker and a reproducing position of said reproducing means; position aligning means for moving said stocker to align one shelf of said stocker, at which a disk to be transported is accommodated, with either one of the first and second transport position levels; and control means, said method comprising steps of:

a first step of transporting a first disk to the outside of said stocker and then a second disk to the outside of said stocker;

a second step of in response to an instruction of accommodating the first disk into said stocker, first transporting the second disk into said stocker without moving said stocker; and a third step of after accommodating the first disk into said stocker, controlling said position aligning means to move said stocker so that a shelf of said stocker at which the first disk is to be accommodated is aligned with either one of the first and second transport levels for transporting the first disk.

9. A method according to claim 8, wherein said instruction is an instruction of accommodating the first disk at the outside of the apparatus housing under the conditions that the second disk has been last transported to the reproducing position, and said second step controls the second transport means to accommodate the second disk into said stocker said third step controls said position aligning means to move said stocker so that a shelf of said stocker at which the first disk is to be accommodated is aligned with the first transport level for transporting the first disk.

10. A method according to claim 8, wherein carriers are disposed at respective ones of the predetermined number of shelves of said stocker and the disk on the carrier is transported with the carrier, further comprising judging means for detecting an idle shelf at which the carrier has been transported to the outside of said stocker, said third step controls said alignment means after accommodating the second disk to move said stocker so that the idle shelf is aligned with either one of the first and second transport level for transporting the first disk.

11. A method according to claim 8, wherein said instruction is an instruction of transporting the first disk to the reproducing position under the conditions that the second disk has been last transported to the outside of the apparatus housing, and said second step controls the first transport means to accommodate the second disk into said stocker and said third step controls said position aligning means to move said stocker so that a shelf of said stocker at which the first disk is accommodated is aligned with the second transport level for transporting the first disk.

12. A multiple disks exchange controller for disk reproducing apparatus comprising: a stocker for accommodating a plurality of disks at respective ones of a predetermined number of shelves stacked therein; transport means including first transport means for, at a first transport position level, transporting a disk between said stocker and the outside of an apparatus housing and second transport means for, at a second transport position level, transporting a disk between said stocker and a reproducing position; position aligning means for moving said stocker to align one shelf of said stocker, at which a disk to be transported is accommodated, with either one of the first and second transport position levels; and control means, wherein upon an instruction of transporting a first disk, said control means controls said transport means to accommodate into said stocker a second disk which has been last transported to the outside of said stocker, and then controls said position aligning means to move said stocker so that a shelf of said stocker for the first disk is aligned with either one of the first and second transport levels for transporting the first disk.

13. A multiple disks exchange controller for disk reproducing apparatus comprising: a stocker for accommodating a plurality of disks at respective ones of a predetermined number of shelves stacked therein; transport means including first transport means for, at a first transport position level, transporting a disk between said stocker and the outside of an apparatus housing and second transport means for, at a second transport position level, transporting a disk between said stocker and a reproducing position of; position aligning means for moving said stocker to align one shelf of said stocker at which a disk to be transported is accommodated with either one of the first and second transport position levels; and control means, wherein said control means inhibits said position aligning means to move said stocker while a disk is being placed at the outside of the apparatus housing, wherein upon a power turn-on instruction while said transport means transports a first disk to the outside of the apparatus housing and transports a second disk to the reproducing position, said control means controls said transport means to accommodate the first disk into said stocker and thereafter the second disk into said stocker.

* * * * *